United States Patent
Nose et al.

(10) Patent No.: US 11,000,946 B2
(45) Date of Patent: May 11, 2021

(54) LINK OPERATING DEVICE

(71) Applicant: NTN CORPORATION, Osaka (JP)

(72) Inventors: Kenzou Nose, Iwata (JP); Hiroshi Isobe, Iwata (JP); Seigo Sakata, Iwata (JP)

(73) Assignee: NTN CORPORATION, Osaka (JP)

( * ) Notice: Subject to any disclaimer, the term of this patent is extended or adjusted under 35 U.S.C. 154(b) by 26 days.

(21) Appl. No.: 16/210,632

(22) Filed: Dec. 5, 2018

(65) Prior Publication Data

US 2019/0105769 A1 Apr. 11, 2019

Related U.S. Application Data

(63) Continuation of application No. PCT/JP2017/020548, filed on Jun. 2, 2017.

(30) Foreign Application Priority Data

Jun. 8, 2016 (JP) .............................. JP2016-114103
May 15, 2017 (JP) .............................. JP2017-096170

(51) Int. Cl.
*B25J 9/00* (2006.01)
*F16H 21/46* (2006.01)
(Continued)

(52) U.S. Cl.
CPC ........... *B25J 9/0048* (2013.01); *B25J 9/0009* (2013.01); *B25J 9/0021* (2013.01); *B25J 9/0045* (2013.01);
(Continued)

(58) Field of Classification Search
CPC ...... B25J 9/0009; B25J 9/0021; B25J 9/0045; B25J 9/0048; B25J 9/06; B25J 9/08;
(Continued)

(56) References Cited

U.S. PATENT DOCUMENTS

| 5,893,296 A | 4/1999 | Rosheim |
| 5,979,264 A | 11/1999 | Rosheim |

(Continued)

FOREIGN PATENT DOCUMENTS

| CN | 103827547 A | 5/2014 |
| CN | 103857942 A | 6/2014 |

(Continued)

OTHER PUBLICATIONS

Notification of Reasons for Refusal dated Dec. 5, 2017 in corresponding Japanese Patent Application No. 2016-114103.
(Continued)

*Primary Examiner* — Joseph Brown

(57) ABSTRACT

In the link operating device, a distal-end-side link hub is connected to a proximal-end-side link hub so as to be changeable in position relative thereto via at least three link mechanisms. Each link mechanism includes a proximal-side end link member, a distal-side end link member, and a center link member. Position-controlling actuators and speed reduction mechanisms are provided to two or more of the link mechanisms. The proximal-side end link member includes a bent portion and a pair of rotational connection bodies disposed at one end of the bent portion. The speed reduction mechanism is disposed between the pair of rotational connection bodies, and includes an output shaft fixed to one of the rotational connection bodies, and an input shaft rotatably supported by the other one of the rotational connection bodies.

11 Claims, 34 Drawing Sheets

(51) Int. Cl.
*B25J 9/12* (2006.01)
*B25J 9/10* (2006.01)
*B25J 9/06* (2006.01)
*B25J 17/02* (2006.01)
*F16M 11/12* (2006.01)

(52) U.S. Cl.
CPC ............... *B25J 9/06* (2013.01); *B25J 9/102* (2013.01); *B25J 9/104* (2013.01); *B25J 9/106* (2013.01); *B25J 9/108* (2013.01); *B25J 9/126* (2013.01); *B25J 17/0216* (2013.01); *F16H 21/46* (2013.01); *F16M 11/121* (2013.01)

(58) Field of Classification Search
CPC ... B25J 9/102; B25J 9/104; B25J 9/106; B25J 9/126; B25J 9/1623; B25J 17/0216; F16H 21/46; F16H 21/48; F16M 11/121
USPC ............... 74/490.05, 490.04; 901/15, 21, 25
See application file for complete search history.

(56) References Cited

U.S. PATENT DOCUMENTS

| | | | | |
|---|---|---|---|---|
| 7,971,505 | B2* | 7/2011 | Isobe | B25J 9/0048 74/490.05 |
| 9,243,696 | B2 | 1/2016 | Isobe et al. | |
| 9,316,266 | B2 | 4/2016 | Isobe et al. | |
| 9,746,037 | B2 | 8/2017 | Sone et al. | |
| 2005/0159075 | A1* | 7/2005 | Isobe | B25J 9/0048 446/104 |
| 2006/0213308 | A1* | 9/2006 | Rosheim | B25J 9/0048 74/490.01 |
| 2012/0043100 | A1* | 2/2012 | Isobe | B25J 17/0266 173/42 |
| 2012/0053701 | A1* | 3/2012 | Yi | B25J 9/1689 700/3 |
| 2013/0055843 | A1* | 3/2013 | Isobe | F16C 1/02 74/490.04 |
| 2013/0192420 | A1* | 8/2013 | Isobe | B25J 11/00 74/99 R |
| 2014/0223722 | A1* | 8/2014 | Isobe | B25J 9/1623 29/428 |
| 2014/0224046 | A1* | 8/2014 | Isobe | F16H 19/08 74/89.14 |
| 2014/0227023 | A1* | 8/2014 | Sone | F16M 13/00 403/180 |
| 2014/0248965 | A1 | 9/2014 | Isobe et al. | |
| 2014/0305244 | A1* | 10/2014 | Yamada | B25J 19/0066 74/479.01 |
| 2015/0088308 | A1* | 3/2015 | Isobe | B25J 9/0048 700/245 |
| 2017/0014994 | A1 | 1/2017 | Isobe et al. | |
| 2018/0290294 | A1 | 10/2018 | Nose et al. | |

FOREIGN PATENT DOCUMENTS

| | | |
|---|---|---|
| EP | 0987087 A2 | 3/2000 |
| EP | 2 759 741 A | 7/2014 |
| JP | 2000-94245 | 4/2000 |
| JP | 2001-520941 | 11/2001 |
| JP | 2013-96547 | 5/2013 |
| JP | 2014-111299 | 6/2014 |
| JP | 2017-115954 | 6/2017 |
| WO | WO 99/21070 A1 | 4/1999 |
| WO | WO 2015/151898 A1 | 10/2015 |

OTHER PUBLICATIONS

Decision of Grant dated Feb. 6, 2018 in corresponding Japanese Patent Application No. 2016-114103.
International Search Report dated Aug. 22, 2017 in corresponding International Application No. PCT/JP2017/020548.
English Translation by WIPO of the International Preliminary Report on Patentability dated Dec. 20, 2018 in corresponding International Application No. PCT/JP2017/020548, 6 pages.
Extended European Search Report dated Dec. 16, 2019 in corresponding European Patent Application No. 17810212.5.
Office Action dated Jan. 4, 2021, in Chinese Patent Application No. 201780035200.2 with machine translation ( 9 pages including machine translation).

* cited by examiner

LINK OPERATING DEVICE

CROSS REFERENCE TO THE RELATED APPLICATION

This application is a continuation application, under 35 U.S.C. § 111(a), of international application No. PCT/JP2017/020548, filed Jun. 2, 2017, which claims priority to Japanese patent application No. 2016-114103, filed Jun. 8, 2016, and Japanese patent application No. 2017-096170, filed May 15, 2017, the disclosure of which are incorporated by reference in their entirety into this application.

BACKGROUND OF THE INVENTION

Field of the Invention

The present invention relates to a link operating device used for devices such as a medical device and an industrial device required to operate at high speed and high accuracy with a wide operating range.

Description of Related Art

Parallel link mechanisms used for various work devices such as a medical device and an industrial device have been proposed in Patent Documents 1 and 2.

RELATED DOCUMENT

Patent Document

[Patent Document 1] JP Laid-open Patent Publication No. 2000-94245
[Patent Document 2] U.S. Pat. No. 5,893,296

SUMMARY OF THE INVENTION

Although the parallel link mechanism of Patent Document 1 has a relatively simple configuration, the operating angle of each link thereof is small. Thus, when the operating range of a traveling plate is set to be large, this parallel link mechanism has an increased link length. Accordingly, a problem arises in that the dimension of the entire mechanism is increased, resulting in increase in the size of the device. In addition, another problem arises in that the entire mechanism has a low rigidity, and the weight of a tool to be mounted on the traveling plate, i.e., the weight capacity of the traveling plate, is limited to a small value.

The parallel link mechanism of Patent Document 2 is configured such that a distal-end-side link hub is connected to a proximal-end-side link hub so as to be changeable in position relative thereto via three or more quadric chain link mechanisms. Thus, this parallel link mechanism becomes compact but can be operated over a wide operating range with high accuracy at high speed.

However, in a case where a link operating device is configured by providing a position-controlling motor, a speed reduction mechanism, and the like to the parallel link mechanism of Patent Document 2, the motor and the speed reduction mechanism are disposed radially outward of the parallel link mechanism. Thus, a problem arises in that the size in the radial direction of the link operating device is increased. In addition, another problem arises in that the speed reduction mechanism or the motor interferes with the link mechanisms, and the operating range is limited.

In view of the above-described problems, the following feature has been proposed: in order to reduce the dimension in the radial direction of the parallel link mechanism, a proximal-side end link member includes a bent portion and a rotational connection portion, and at least a part of a gear mechanism for transmitting rotary motion of a position-controlling actuator to the proximal-side end link member, is disposed in a space interposed between two imaginary planes obtained by extending, in the length direction of the rotational connection portion, a radially inner edge and a radially outer edge of the bent portion (JP Laid-open Patent Publication No. 2017-115954). However, a problem arises in that the configuration in this proposal is applicable to a case where axes of an input shaft and an output shaft of the speed reduction mechanism intersect with each other, but is not applicable to a case where the input shaft and the output shaft are coaxial with each other.

An object of the present invention is to provide a link operating device which can be operated over a wide operating range with high accuracy at high speed, and in which a speed reduction mechanism having an input shaft and an output shaft coaxial with each other can be disposed without increasing the dimension in the radial direction of the link operating device.

A link operating device according to the present invention is a link operating device including:
a proximal-end-side link hub;
a distal-end-side link hub;
at least three link mechanisms via which the distal-end-side link hub is connected to the proximal-end-side link hub so as to be changeable in position relative thereto,
each link mechanism including
a proximal-side end link member having one end pivotably coupled to the proximal-end-side link hub,
a distal-side end link member having one end pivotably coupled to the distal-end-side link hub, and
a center link member having opposite ends pivotably coupled to the other end of the proximal-side end link member and the other end of the distal-side end link member, respectively;
position-controlling actuators provided to two or more link mechanisms among the at least three link mechanisms, and each configured to arbitrarily change a position of the distal-end-side link hub relative to the proximal-end-side link hub; and
speed reduction mechanisms each configured to reduce a speed of the rotation and transmit a power of the rotation to the corresponding proximal-side end link member.

In the link operating device, the proximal-side end link member includes a bent portion bent at an arbitrary angle, and a rotational connection portion disposed at one end of the bent portion and including a pair of rotational connection bodies arranged so as to be spaced from each other,
each speed reduction mechanism includes an input shaft and an output shaft coaxial with each other, and is disposed between the corresponding pair of rotational connection bodies such that axes of the input shaft and the output shaft coincide with a center axis of a revolute pair formed between the proximal-end-side link hub and the proximal-side end link member, and
the output shaft of the speed reduction mechanism is fixed to one rotational connection body of the pair of rotational connection bodies, and the input shaft of the speed reduction mechanism is rotatably supported by the other rotational connection body of the pair of rotational connection bodies.

According to this configuration, when each position-controlling actuator is rotationally driven, the power of the rotation thereof is lessened so as to reduce the speed of the rotation via the speed reduction mechanism and then is transmitted to the proximal-side end link member. Accordingly, the angle of the proximal-side end link member is changed so that the position of the distal-end-side link hub is changed relative to the proximal-end-side link hub. Since the distal-end-side link hub is connected to the proximal-end-side link hub so as to be changeable in position relative thereto via the three or more quadric chain link mechanisms, the link operating device becomes compact but can be operated over a wide operating range with high accuracy at high speed.

Since the proximal-side end link member is bent at the bent portion, the entire link operating device has a reduced dimension in the radial direction, whereby a compact configuration can be obtained. In addition, since the output shaft of the speed reduction mechanism is fixed to one of the rotational connection bodies and the input shaft of the speed reduction mechanism is rotatably supported by the other rotational connection body, the speed reduction mechanism can be disposed between the pair of rotational connection bodies. Accordingly, the speed reduction mechanism can be disposed so as not to project radially outward of the parallel link mechanism, whereby a further compact configuration can be obtained. That is, the speed reduction mechanism having the input shaft and the output shaft coaxial with each other, can be disposed without increasing the dimension in the radial direction of the link operating device. Besides, by disposing the speed reduction mechanism between the pair of rotational connection bodies, a configuration in which the speed reduction mechanism connects the pair of rotational connection bodies to each other can be obtained, and this configuration is advantageous in improving the rigidity.

In one embodiment of the present invention, each position-controlling actuator may be disposed such that axes of a rotational output shaft of the position-controlling actuator and the input shaft of the corresponding speed reduction mechanism are orthogonal to each other. In this case, the rotational output shaft of the position-controlling actuator and the input shaft of the speed reduction mechanism are connected to each other with use of, for example, bevel gears such that power can be transmitted therebetween. Accordingly, a configuration in which another part is not disposed near the revolute pair formed between the proximal-end-side link hub and the proximal-side end link member can be obtained, whereby the parallel link mechanism can have a wide motion range.

In the case where the axes of the rotational output shaft of the position-controlling actuator and the input shaft of the speed reduction mechanism are orthogonal to each other, the rotational output shaft of each position-controlling actuator and a center axis of the proximal-end-side link hub may be parallel to each other. The center axis of the proximal-end-side link hub refers to a straight line that passes a proximal-end-side spherical link center and that intersects, at a right angle, with the center axis of the revolute pair formed between the proximal-end-side link hub and each proximal-side end link member, where the proximal-end-side spherical link center refers to a point at which the center axis of the revolute pair formed between the proximal-end-side link hub and the proximal-side end link member intersects with a center axis of a revolute pair formed between the proximal-side end link member and the corresponding center link member. With this configuration, the position-controlling actuator can be disposed near the center of the parallel link mechanism, whereby a compact configuration can be obtained.

In one embodiment of the present invention, each position-controlling actuator may be disposed such that a rotational output shaft of the position-controlling actuator and the input shaft of the corresponding speed reduction mechanism are parallel to each other. With this configuration, the position-controlling actuator can be disposed near the center of the parallel link mechanism, whereby a compact configuration can be obtained.

In addition, with the above-described configuration, if a power-transmitting belt is wound on a pulley attached to the rotational output shaft of each position-controlling actuator and a pulley attached to the input shaft of the corresponding speed reduction mechanism, power can be transmitted from the rotational output shaft of the position-controlling actuator to the input shaft of the speed reduction mechanism.

In one embodiment of the present invention, the proximal-end-side link hub may include a proximal end member that supports each link mechanism, and the center axis of the revolute pair formed between the proximal-end-side link hub and each proximal-side end link member and the output shaft of the corresponding position-controlling actuator may be disposed on respective opposite sides with respect to the proximal end member.

According to this configuration, when each position-controlling actuator is rotationally driven, the power of the rotation thereof is transmitted to the proximal-side end link member. Accordingly, the angle of the proximal-side end link member is changed so that the position of the distal-end-side link hub is changed relative to the proximal-end-side link hub. Since the parallel link mechanism is configured such that the distal-end-side link hub is connected to the proximal-end-side link hub so as to be changeable in position relative thereto via the three or more quadric chain link mechanisms, the link operating device becomes compact but can be operated over a wide operating range with high accuracy at high speed.

In this configuration, since the center axis of the revolute pair formed between the proximal-end-side link hub and the proximal-side end link member, and the output shaft of the position-controlling actuator, are disposed on the opposite sides with respect to the proximal end member, the position-controlling actuator or a part provided along with the position-controlling actuator is not disposed near the revolute pair portion between the proximal-end-side link hub and the proximal-side end link member. Thus, the position-controlling actuator and the parallel link mechanism are less likely to interfere with each other, whereby the parallel link mechanism can have a reduced dimension in the radial direction but can have a wide motion range. In addition, since the position-controlling actuator is located as described above, no component of the parallel link mechanism is present on a surface, of the proximal end member, on a side opposite to the side where each link mechanism is present, whereby the degree of freedom in designing regarding the disposition of the position-controlling actuator is high.

In one embodiment of the present invention, the proximal-end-side link hub may include a plurality of rotational support members disposed so as to project from the proximal end member toward a distal end side and configured to rotatably support the respective proximal-side end link members, and the output shaft of each position-controlling actuator may be parallel to a mounting surface of the proximal end member, on which the plurality of rotational support members are arranged In this case, the output shaft of the position-controlling actuator can be disposed close to the proximal end member as a whole. Accordingly, it is possible to reduce the dimension, of the entire link operating device, in a direction along the center axis of the proximal-end-side link hub.

In one embodiment of the present invention, the proximal-end-side link hub may include a plurality of rotational support members disposed so as to project from the proximal end member toward a distal end side and configured to rotatably support the respective proximal-side end link members, and the center axis of the revolute pair formed between the proximal-end-side link hub and each proximal-side end link member may be parallel to the mounting surface of the proximal end member, on which the plurality of rotational support members are arranged. In this case, the center axis of the revolute pair formed between the proximal-end-side link hub and the proximal-side end link member can be located close to the proximal end member as a whole. Accordingly, it is possible to reduce the dimension, of the entire link operating device, in a direction along the center axis of the proximal-end-side link hub.

In one embodiment of the present invention, the proximal end member may have a through hole at a center portion thereof around which the plurality of rotational support members are arranged. By forming the through hole in the proximal end member, a wire or the like can be passed in the through hole, whereby the wire or the like can be easily routed.

In one embodiment of the present invention, each position-controlling actuator may be disposed inward relative to the output shaft thereof. With this configuration, the dimension in the radial direction of an area in which the position-controlling actuators are disposed is reduced, whereby a compact configuration can be obtained. In addition, as compared to a configuration in which the position-controlling actuator is disposed so as to extend in a direction along the center axis of the proximal-end-side link hub, the dimension, of the entire link operating device, in a direction along the center axis of the proximal-end-side link hub is reduced.

When the position-controlling actuator is disposed inward relative to the output shaft thereof, the position-controlling actuator may be disposed such that the output shaft thereof is parallelly offset from a plane formed by the center axis of the proximal-end-side link hub and the center axis of the revolute pair formed between the proximal-end-side link hub and the proximal-side end link member. By disposing the position-controlling actuators in an offset manner, the position-controlling actuators can be prevented from interfering with each other. In addition, a wide space for allowing the wire or the like to pass therethrough can be secured at a center portion in the radial direction of the area in which the position-controlling actuators are disposed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
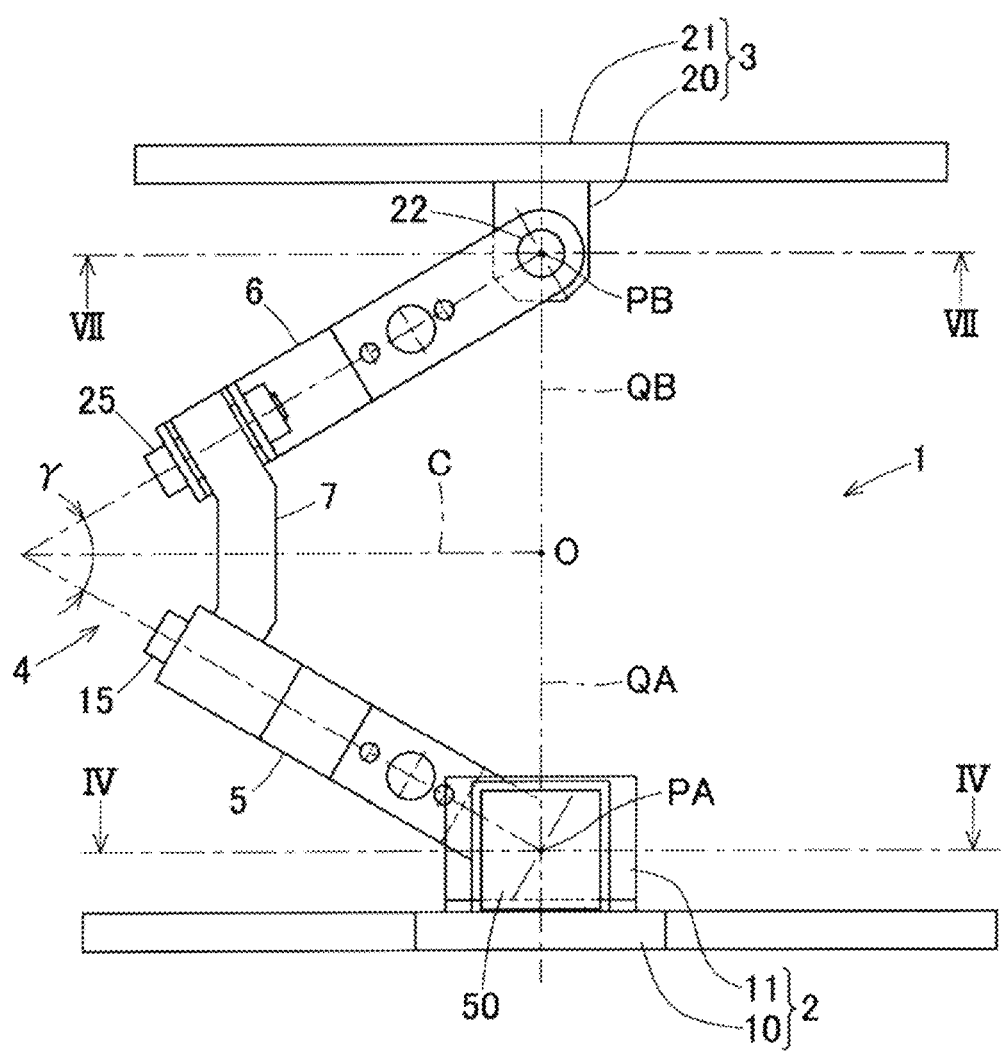
FIG. 1 is a front view of a link operating device according to one embodiment of the present invention, with a portion thereof being omitted.

A link operating device according to one embodiment of the present invention will be described with reference to FIGS. 1 to 9. FIG. 1 is a front view of the link operating device, with a portion thereof being omitted. The link operating device includes: a parallel link mechanism 1; position-controlling actuators 50 for actuating the parallel link mechanism 1; and speed reduction mechanisms (not shown in FIG. 1).

Figure 2:
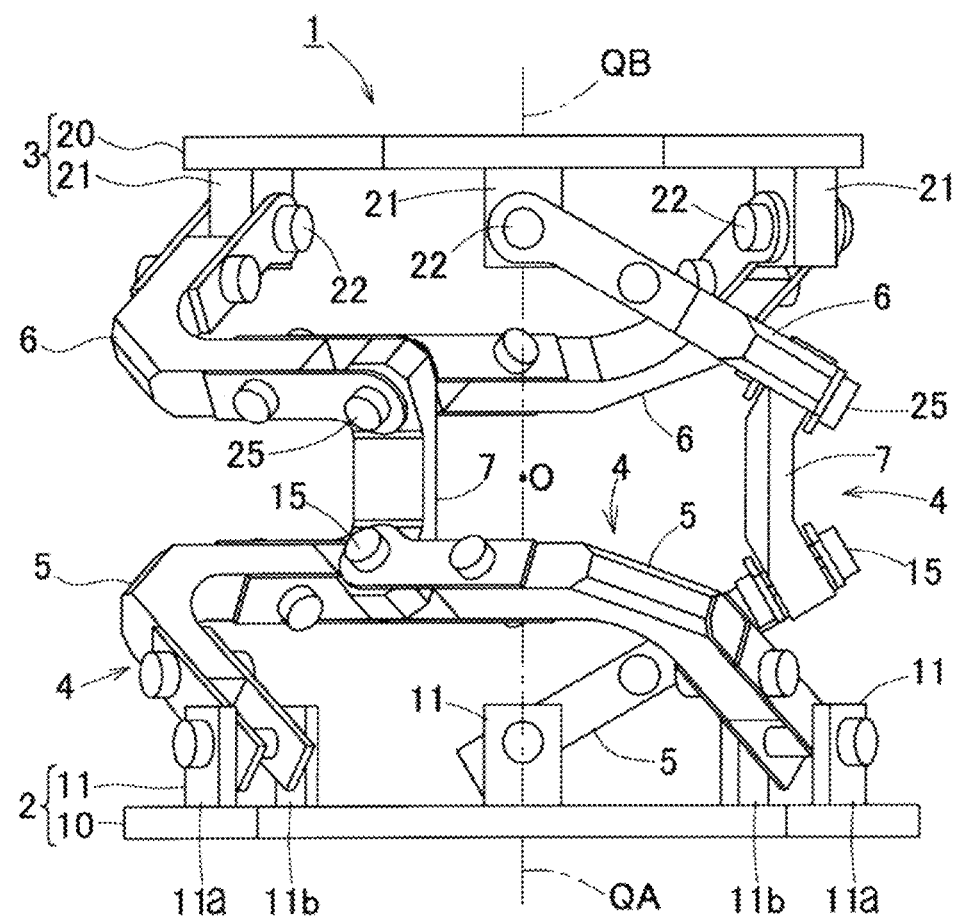
FIG. 2 is a view of a parallel link mechanism of the link operating device, in one state.
Figure 3:
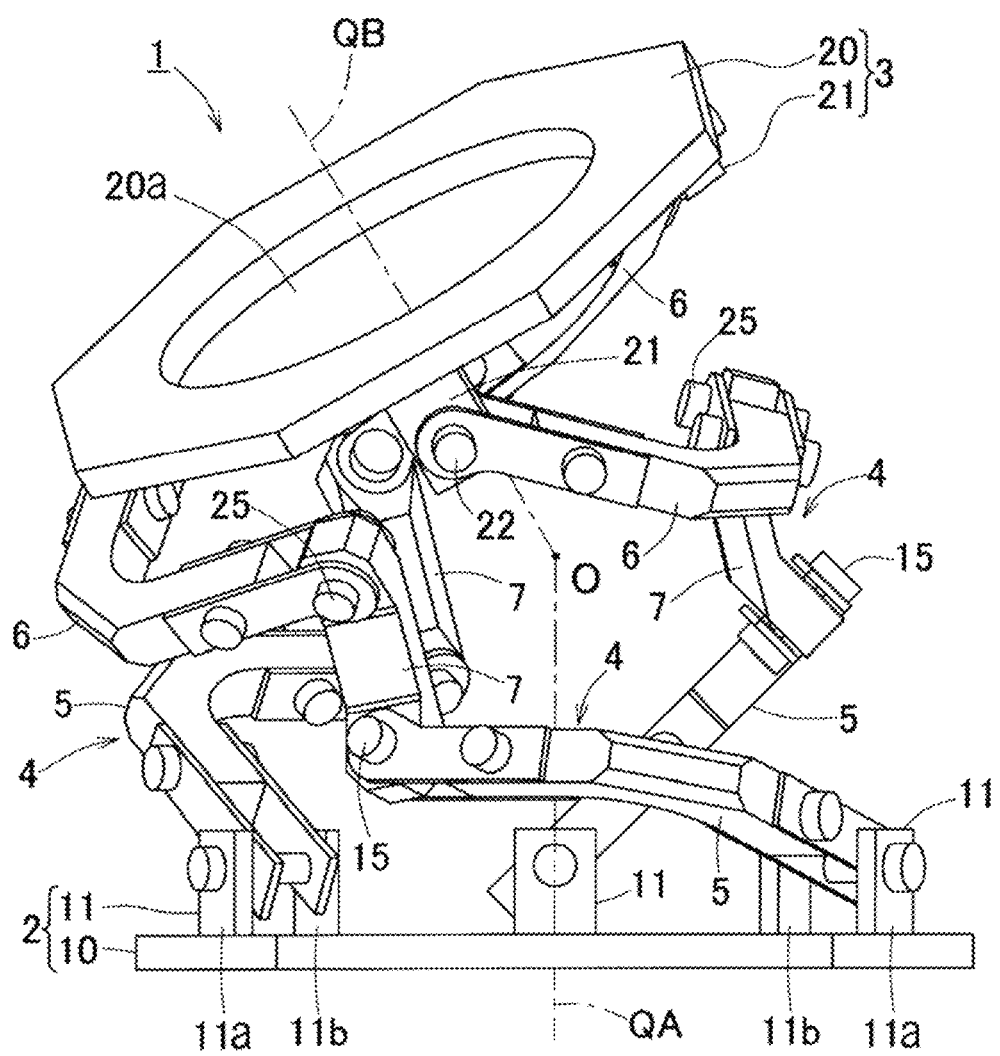
FIG. 3 is a view of the parallel link mechanism in another state.

FIG. 2 illustrates the parallel link mechanism 1 in one state. FIG. 3 illustrates the parallel link mechanism 1 in another state. FIG. 2 and FIG. 3 show states as seen from a direction opposite to the direction from which the link operating device is seen in FIG. 1. In the parallel link mechanism 1, a distal-end-side link hub 3 is connected to a proximal-end-side link hub 2 so as to be changeable in position relative thereto via three link mechanisms 4. FIG. 1 shows only one of the link mechanisms 4. The number of the link mechanisms 4 may be four or more. FIG. 2 and FIG. 3 show a basic configuration of the parallel link mechanism 1, and, in a case where the link operating device is configured by mounting the position-controlling actuators 50 and the speed reduction mechanisms thereon, a part of the parallel link mechanism 1 has a configuration different from that shown in the drawings.

In FIGS. 1 to 3, each link mechanism 4 includes a proximal-side end link member 5, a distal-side end link member 6, and a center link member 7, and is in the form of a quadric chain link mechanism including four revolute pairs. Each of the proximal-side end link member 5 and the distal-side end link member 6 is formed so as to be L-shaped. One end of the proximal-side end link member 5 is pivotably coupled to the proximal-end-side link hub 2. The distal-side end link member 6 is pivotably coupled to the distal-end-side link hub 3. The center link member 7 has opposite ends, to which the other ends of the proximal-side and distal-side end link members 5 and 6 are pivotably coupled, respectively.

The parallel link mechanism 1 has a structure obtained by combining two spherical link mechanisms, and center axes of respective revolute pairs between the link hubs 2, 3 and the end link members 5, 6, and center axes of respective revolute pairs between the end link members 5, 6 and the center link member 7, intersect with each other at spherical link centers PA, PB (FIG. 1) on the proximal end side and the distal end side, respectively. On the proximal end side and the distal end side, the distances from the spherical link centers PA, PB to the respective revolute pairs between the link hubs 2, 3 and the end link members 5, 6, are equal to one another, the distances from the spherical link centers PA, PB to the respective revolute pairs between the end link members 5, 6 and the center link members 7, are also equal to one another. The center axes of the respective revolute pairs between the end link members 5, 6 and the center link member 7 may form a certain intersection angle γ (FIG. 1) therebetween, or may be parallel to each other.

Figure 4:
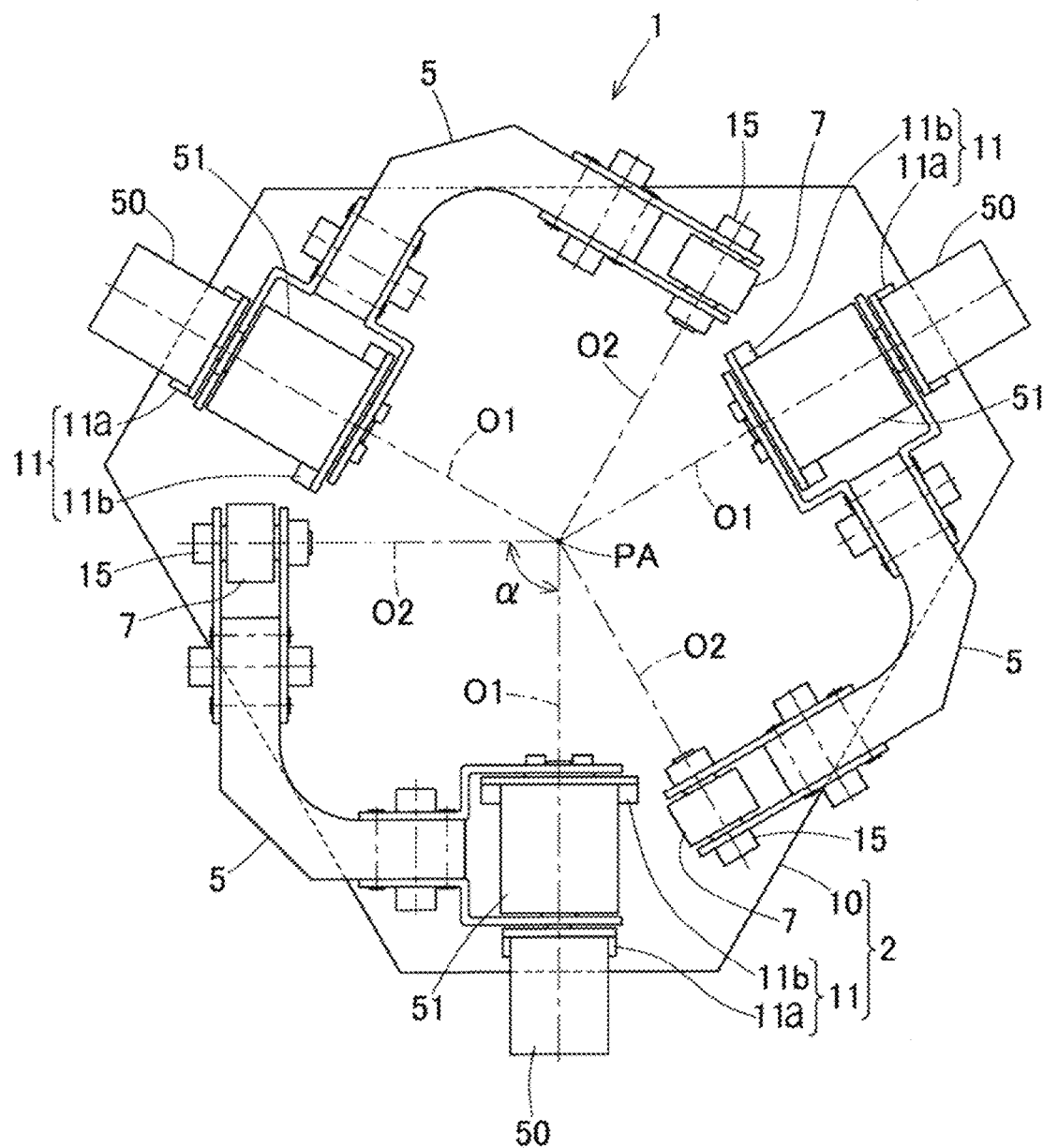
FIG. 4 is a cross-sectional view taken along a line IV-IV in FIG. 1.
Figure 7:
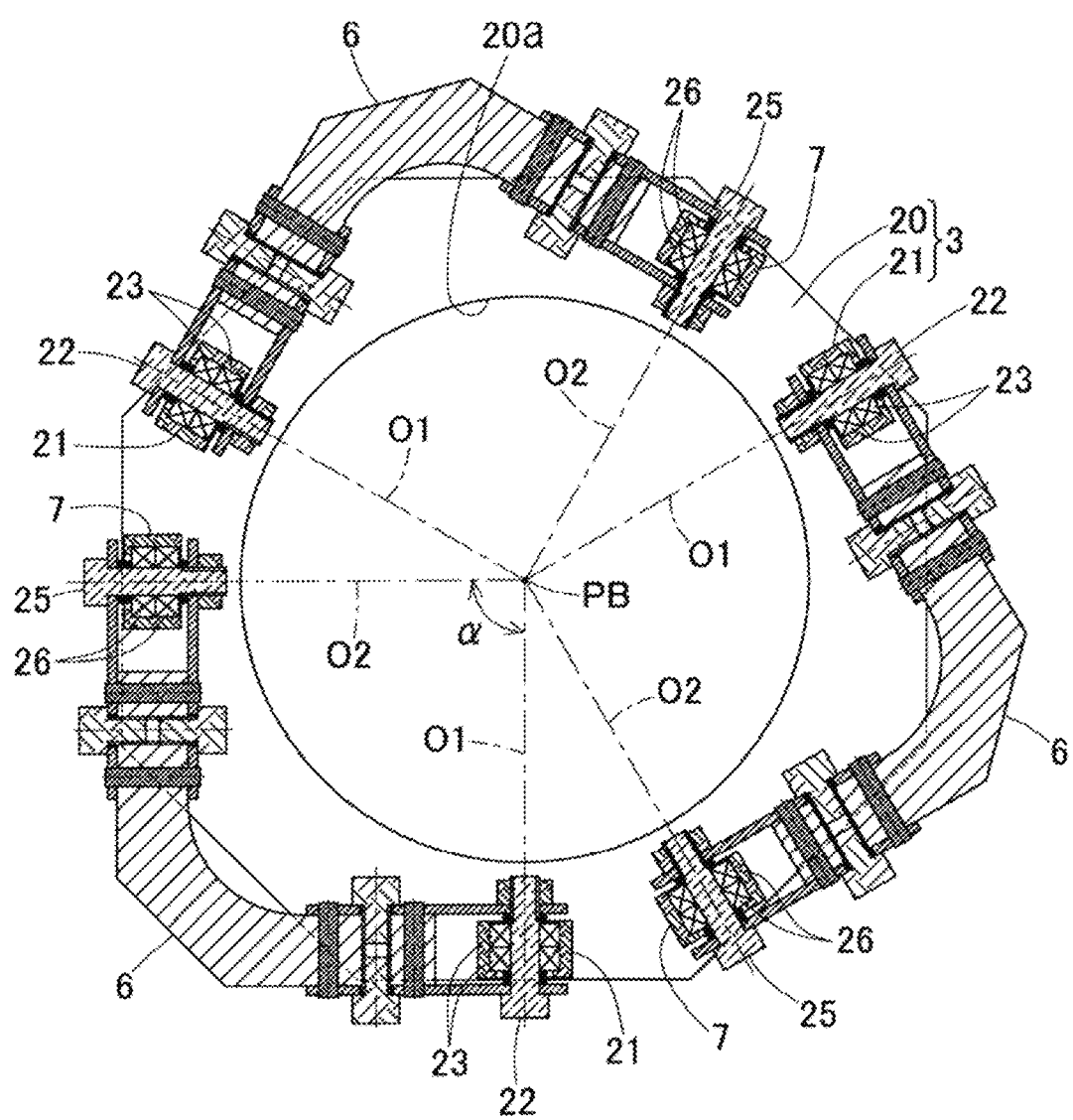
FIG. 7 is a cross-sectional view taken along a line VII-VII in FIG. 1.

FIG. 4 is a cross-sectional view taken along a line IV-IV in FIG. 1, and shows the relationship among: center axes O1 of the respective revolute pairs between the proximal-end-side link hub 2 and the proximal-side end link members 5; center axes O2 of the respective revolute pairs between the center link members 7 and the proximal-side end link members 5; and the proximal-end-side spherical link center PA. That is, a point at which the center axes O1 and the center axes O2 intersect with each other, is the proximal-end-side spherical link center PA. FIG. 7 is a cross-sectional view taken along a line VII-VII in FIG. 1, and shows the relationship among: center axes O1 of the respective revolute pairs between the distal-end-side link hub 3 and the distal-side end link members 6; center axes O2 of the respective revolute pairs between the center link members 7 and the distal-side end link members 6; and the distal-end-side spherical link center PB. That is, a point at which the center axes O1 and the center axes O2 intersect with each other, is the distal-end-side spherical link center PB. In the examples in FIG. 4 and FIG. 7, an angle α formed by the center axis O1 of each revolute pair formed between the link hub 2, 3 and the end link member 5, 6 and the center axis O2 of each revolute pair formed between the end link member 5, 6 and the center link member 7, is 90°. However, the angle α is not limited to 90°.

Figure 9:
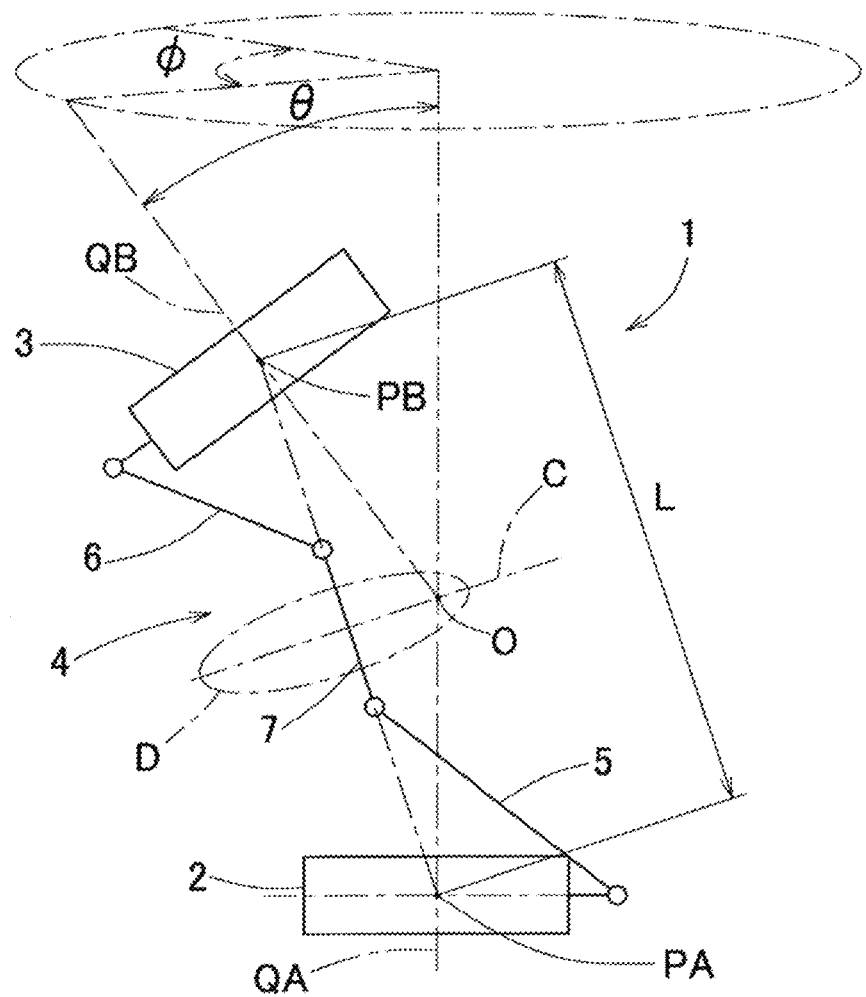
FIG. 9 is a view in which one link mechanism of the parallel link mechanism is depicted with straight lines.

The three link mechanisms 4 have geometrically identical forms. The geometrically identical forms mean that, as shown in FIG. 9, a geometric model depicted with straight lines that represent the link members 5, 6, and 7, i.e., a model depicted with the revolute pairs and straight lines connecting these revolute pairs to each other, has such a shape that a proximal-end-side portion thereof and a distal-end-side portion thereof are symmetric with each other about a center portion of the center link member 7. FIG. 9 is a view in which one of the link mechanisms 4 is depicted with straight lines. The parallel link mechanism 1 according to the present embodiment is of a rotationally symmetrical type, and a has a positional configuration in which a positional relationship is established such that the proximal-end-side link hub 2 and the proximal-side end link member 5 are rotationally symmetric, about a center line C of the center link member 7, with the distal-end-side link hub 3 and the distal-side end link member 6. The center portions of the center link members 7 are located on the same orbital circle D.

The proximal-end-side link hub 2, the distal-end-side link hub 3, and the three link mechanisms 4 form a mechanism having two degrees of freedom, in which the distal-end-side link hub 3 is rotatable, about orthogonal two axes, relative to the proximal-end-side link hub 2. In other words, in this mechanism, the position of the distal-end-side link hub 3 is changeable relative to the proximal-end-side link hub 2, with two degrees of rotational freedom. This mechanism having two degrees of freedom is compact but provides a wide range of possible movement of the distal-end-side link hub 3 relative to the proximal-end-side link hub 2.

For example, in a case where a straight line that passes the spherical link center PA, PB and that intersects, at the right angle, with the center axis O1 (FIG. 4 and FIG. 7) of the revolute pair formed between the link hub 2, 3 and the end link member 5, 6, is defined as a center axis QA, QB of the link hub 2, 3, the maximum value of a bend angle θ (FIG. 9) formed by the center axis QA of the proximal-end-side link hub 2 and the center axis QB of the distal-end-side link hub 3, can be set to approximately ±90°. In addition, an angle of traverse φ (FIG. 9) of the distal-end-side link hub 3 relative to the proximal-end-side link hub 2 can be set to the range of 0° to 360°. The bend angle θ refers to a vertical angle formed when the center axis QB of the distal-end-side link hub 3 is tilted relative to the center axis QA of the proximal-end-side link hub 2. The angle of traverse φ refers to a horizontal angle formed when the center axis QB of the distal-end-side link hub 3 is tilted around the center axis QA of the proximal-end-side link hub 2.

The position of the distal-end-side link hub 3 relative to the proximal-end-side link hub 2 is changed with, as a rotation center, an intersection point O of the center axis QA of the proximal-end-side link hub 2 and the center axis QB of the distal-end-side link hub 3. FIG. 2 shows a state where the center axis QA of the proximal-end-side link hub 2 and the center axis QB of the distal-end-side link hub 3 are on the same line. FIG. 3 shows a state where the center axis QB of the distal-end-side link hub 3 is tilted at a certain operating angle relative to the center axis QA of the proximal-end-side link hub 2. Even if the position is changed, a distance L (FIG. 9) between the proximal-end-side and distal-end-side spherical link centers PA and PB is unchanged.

If the link mechanisms 4 satisfy the following conditions, the proximal-end-side link hub 2 and the proximal-side end link member 5, and the distal-end-side link hub 3 and the distal-side end link member 6, move in the same manner owing to geometrical symmetry. Thus, when transmitting rotation from the proximal end side to the distal end side, the parallel link mechanism 1 functions as a constant velocity universal joint that is rotated at a constant velocity with the same rotation angle being formed on the proximal end side and the distal end side.

Condition 1: The angles formed by, and the lengths of, the center axes O1 of the revolute pairs between the link hubs 2, 3 and the end link members 5, 6 in the respective link mechanisms 4 are equal to one another.

Condition 2: The center axes O1 of the revolute pairs between the link hubs 2, 3 and the end link members 5, 6, and the center axes O2 of the revolute pairs between the end link members 5, 6 and the center link member 7 intersect with each other at the spherical link centers PA, PB on the proximal end side and the distal end side, respectively.

Condition 3: Each proximal-side end link member 5 and each distal-side end link member 6 have geometrically identical forms.

Condition 4: A proximal-end-side portion and a distal-end-side portion of the center link member 7 have geometrically identical forms.

Condition 5: Relative to a symmetry plane of the center link member 7, the angular positional relationships between the center link member 7 and the end link members 5, 6 are the same between the proximal end side and the distal end side.

As shown in FIGS. 1 to 4, the proximal-end-side link hub 2 includes a flat-plate-shaped proximal end member 10 and three rotational support members 11 circumferentially equidistantly disposed on the proximal end member 10. In the shown example, the flat-plate-shaped proximal end member 10 is disposed such that the upper and lower surfaces thereof are horizontal, and the rotational support members 11 project upward from the upper surface of the proximal end member 10. The proximal end member 10 does not have to be flat-plate-shaped. The center of the circle on which the three rotational support members 11 are disposed, is located on the center axis QA of the proximal-end-side link hub 2. Each rotational support member 11 includes an actuator support member 11a located on the radially outer side, and a speed reduction mechanism support member 11b located on the radially inner side. The actuator support member 11a and the speed reduction mechanism support member 11b are arranged so as to be spaced from each other at a certain interval.

To each rotational support member 11, one end of the corresponding proximal-side end link member 5 is pivotably coupled. By the actuator support member 11a of the rotational support member 11, the corresponding position-controlling actuator 50 (FIG. 1 and FIG. 4) is supported. By the speed reduction mechanism support member 11b of the rotational support member 11, the corresponding speed reduction mechanism 51 (FIG. 4) is supported. Description will be made later as to how the rotational support member 11 and the proximal-side end link member 5 are connected to each other, and how the position-controlling actuator 50 and the speed reduction mechanism 51 are supported by the rotational support member 11.

Figure 5:
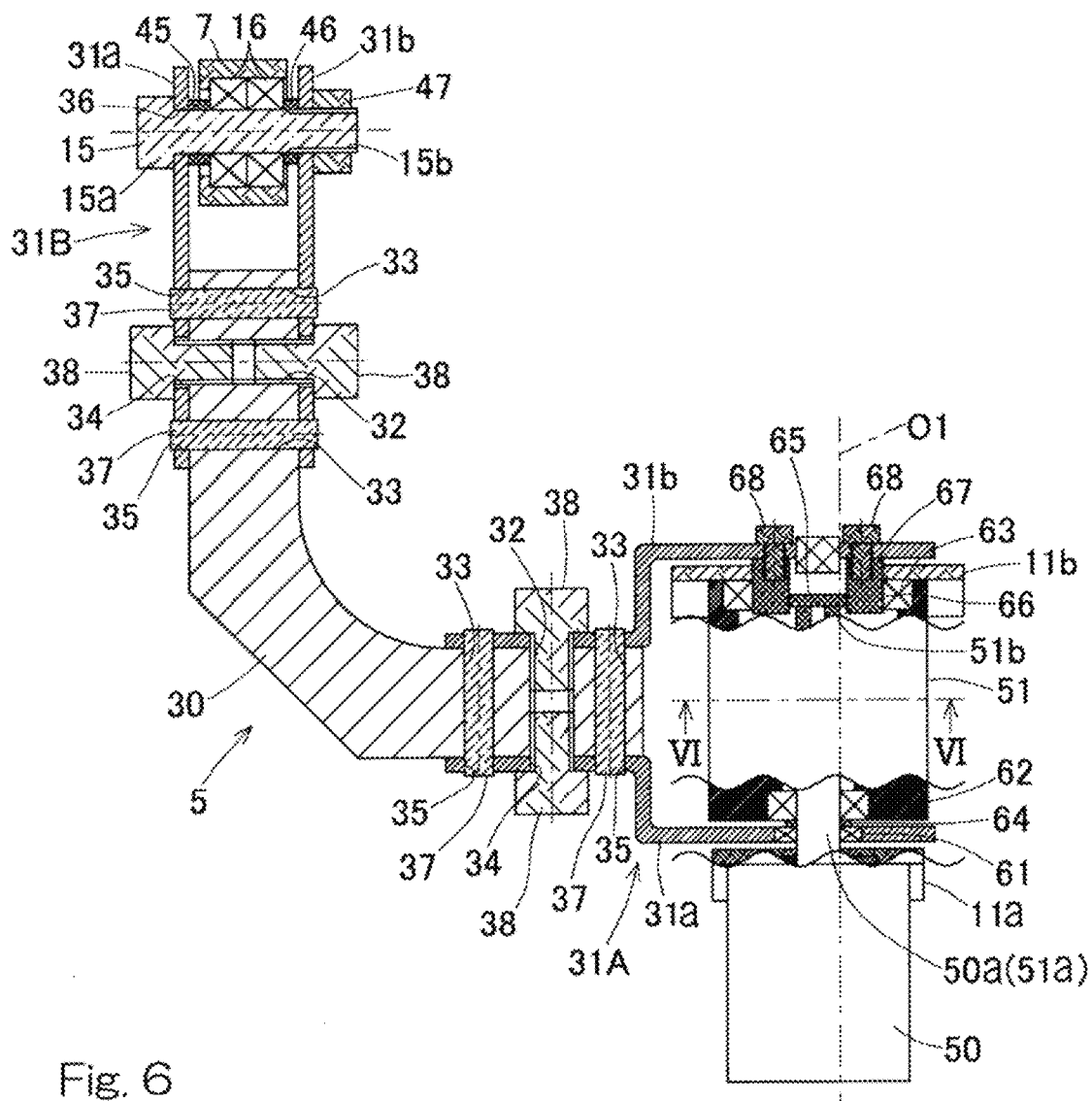
FIG. 5 is a partial cross-sectional view of FIG. 4.

As shown in FIG. 5 which is a partial cross-sectional view of FIG. 4, a rotary shaft 15 is attached to the other end of the proximal-side end link member 5. The rotary shaft 15 is rotatably supported at one end of the center link member 7 via, for example, two bearings 16. Instead of using the bearings 16, the rotary shaft 15 may be made rotatably in contact with the one end of the center link member 7, so that the rotary shaft 15 can be rotatably supported.

As the bearings 16, ball bearings such as deep groove ball bearings or angular contact ball bearings are used, for example. These bearings 16 are fixed to the center link member 7 by a method such as press-fitting, adhesion, or crimping. The types of the bearings provided to the other revolute pair portions, and methods for disposing these bearings, are the same as those described above. Instead of using the bearings 16 as in this example, the rotary shaft 15 may be made rotatably in contact with the center link member 7, so that the rotary shaft 15 can be rotatably supported.

As shown in FIGS. 1 to 3 and FIG. 7, the distal-end-side link hub 3 includes a distal end member 20 and three rotational support members 21 circumferentially equidistantly disposed on the distal end member 20. The distal end member 20 is flat-plate-shaped, for example. The center of the circle on which the three rotational support members 21 are disposed, is located on the center axis QB of the distal-end-side link hub 3. As shown in FIGS. 3 and 7, the distal-end-side link hub 3 has a through hole 20a of a circular shape on the inner side relative to the three rotational support members 21. By each rotational support member 21, a rotary shaft 22 having an axis intersecting with the center axis QB (FIG. 1) of the distal-end-side link hub 3 is rotatably supported via bearings 23. The rotary shaft 22 is attached to one end of the distal-side end link member 6.

A rotary shaft 25 is attached to the other end of the distal-side end link member 6. The rotary shaft 25 is rotatably supported at the other end of the center link member 7 via, for example, two bearings 26. Instead of using the bearings 26, the rotary shaft 25 may be made rotatably in contact with the other end of the center link member 7, so that the rotary shaft 25 can be rotatably supported.

Next, the configurations of the end link members 5, 6 will be described with reference to FIG. 5 which is a partial cross-sectional view of FIG. 4, and FIG. 8 which is a partial view of FIG. 7. The proximal-side end link member 5 and the distal-side end link member 6 have the same configuration except for some portions thereof. Here, the proximal-side end link member 5 will be described as a representative, and, as for the distal-side end link 6, reference numerals for the corresponding portions will be described in parentheses. Portions different in configuration between the proximal-side and distal-side end link members 5 and 6 will be described as necessary.

As shown in FIG. 5 (FIG. 8), the end link member 5 (6) includes a single bent portion 30, and a link-hub-side rotational connection portion 31A and a center-link-side rotational connection portion 31B respectively located on opposite ends of the bent portion 30. In the present embodiment, each of the rotational connection portions 31A and 31B includes a pair of rotational connection bodies 31a and 31b respectively fixed to the outer surface and the inner surface of an end portion of the bent portion 30.

The bent portion 30 is, for example, a cast product made of a metal material. The bent portion 30 has such a shape as to be bent at a predetermined angle α (see FIG. 4; 90° in this example). The bending angle α can be arbitrarily determined. At each end of the bent portion 30, one bolt thread hole 32 is formed so as to penetrate from the outer surface to the inner surface. At each end of the bent portion 30, two positioning holes 33 are formed so as to be located on opposed sides of the bolt thread hole 32.

The rotational connection body 31a, 31b of the rotational connection portion 31A, 31B is formed in a predetermined shape by performing working such as sheet metal working on a plate-shaped member having a uniform thickness such as a metal sheet. The rotational connection bodies 31a and 31b (FIG. 5) of the link-hub-side rotational connection portion 31A of the proximal-side end link member 5 are formed in bent shapes, as described later. The other rotational connection bodies 31a and 31b are formed in flat-plate shapes. Each of the rotational connection bodies 31a and 31b is formed with one bolt insertion hole 34 corresponding to the bolt thread hole 32 of the bent portion 30, and two positioning holes 35 corresponding to the positioning holes 33 of the bent portion 30. A through hole 36 is formed so as to allow any of the rotary shafts 15, 22, and 25 to be inserted thereinto, in each of the rotational connection bodies 31a and 31b used for the rotational connection portions 31A and 31B other than the link-hub-side rotational connection portion 31A of the proximal-side end link member 5. By using a plate-shaped member having a simple shape and a uniform thickness as the material for the rotational connection bodies 31a and 31b, the rotational connection bodies 31a and 31b can be produced at low cost and the mass productivity thereof is excellent. In particular, by using a metal sheet as the material, working for the contour shape and the respective holes 34, 35, and 36 can be easy.

In fixing the bent portion 30 and the rotational connection bodies 31a and 31b to each other, positioning pins 37 are inserted through the positioning holes 33 of the bent portion 30 and the positioning holes 35 of the outer and inner rotational connection bodies 31a and 31b, to position the bent portion 30 and the rotational connection bodies 31a and 31b. In this state, bolts 38 are inserted through the bolt insertion holes 34 of the respective rotational connection bodies 31a and 31b from the outer side and the inner side, respectively, such that thread portions of the bolts 38 are screwed into the bolt thread hole 32 of the bent portion 30. That is, the outer and inner rotational connection bodies 31a and 31b are individually fixed to the bent portion 30 by means of the bolts 38 different from each other, in a state of being positioned by the shared positioning pins 37. By using the positioning pins 37 as described above, assembling becomes easy and variation in accuracy of assembling among workers is reduced. In addition, the accuracy of the positional relationship between the bent portion 30 and the rotational connection bodies 31a and 31b is improved, whereby the parallel link mechanism 1 can be smoothly operated.

As shown in FIG. 5, in the link-hub-side rotational connection portion 31A of the proximal-side end link member 5, the pair of outer and inner rotational connection bodies 31a and 31b are each formed in a bent shape by, for example, bending. In the link-hub-side rotational connection portion 31A, the interval between portions connected to the rotational support member 11 is made larger than the interval between portions fixed to the bent portion 30. The outer rotational connection body 31a is disposed on the inner side relative to the actuator support member 11a of the rotational support member 11. The inner rotational connection body 31b is disposed on the inner side relative to the speed reduction mechanism support member 11b of the rotational support member 11. The rotational connection portion 31A of the proximal-side end link member 5 is assembled to the rotational support member 11 along with the position-controlling actuator 50 and the speed reduction mechanism 51. Specifically, the assembling is performed as follows.

The position-controlling actuator 50 is fixed to the outer surface of the actuator support member 11a of the rotational support member 11. As the position-controlling actuator 50, a rotary motor is used, for example. A rotational output shaft 50a of the position-controlling actuator 50 penetrates the actuator support member 11a and the outer rotational connection body 31a, and extends inward of the rotational connection body 31a. The rotational output shaft 50a is rotatably supported by a bearing 61 provided to the rotational connection body 31a.

The speed reduction mechanism 51 is fixed to the outer surface of the speed reduction mechanism support member 11b of the rotational support member 11. The speed reduction mechanism 51 is formed such that an input shaft 51a thereof and an output shaft 51b thereof are coaxial with each other. The input shaft 51a and the output shaft 51b are coaxial with the center axis O1 of the revolute pair formed between the proximal-end-side link hub 2 and the proximal-side end link member 5. In the present embodiment, the input shaft 51a of the speed reduction mechanism 51 is commonly serves as the rotational output shaft 50a of the position-controlling actuator 50. The input shaft 51a and the output shaft 51b are rotatably supported by a housing of the speed reduction mechanism 51 via the bearings 62 and 63, respectively. A spacer 64 is interposed between the speed reduction mechanism 51 and the actuator support member 11*a*.

A flange 65 is fixed to the distal end of the output shaft 51*b* of the speed reduction mechanism 51. A cylindrical member 66 is fixed to the outer circumference of the flange 65. The cylindrical member 66 penetrates the speed reduction mechanism support member 11*b* through an inner-diameter hole 67 thereof so as to extend inward, and the distal end surface of the cylindrical member 66 is connected to the inner rotational connection body 31*b* by means of a plurality of bolts 68.

Figure 6:
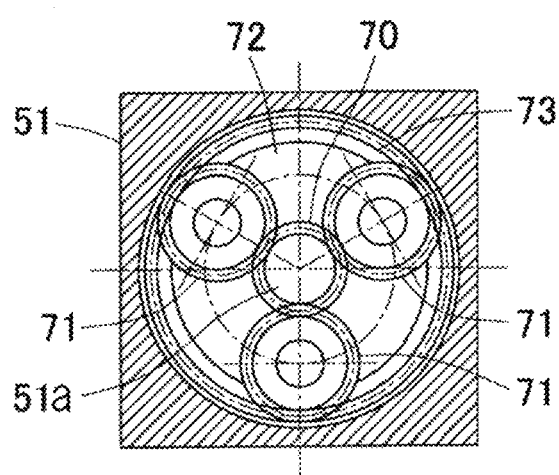
FIG. 6 is a cross-sectional view taken along a line VI-VI in FIG. 5.

In the present embodiment, the speed reduction mechanism 51 is formed as a planetary-gear mechanism. As shown in FIG. 6 which is a cross-sectional view taken along a line VI-VI in FIG. 5, the speed reduction mechanism 51 formed as the planetary-gear mechanism includes a sun gear 70, a plurality of planetary gears 71, a carrier 72, and an internal gear 73. For example, the sun gear 70 is connected to the input shaft 51*a* and the carrier 72 is connected to the output shaft 51*b*, so that rotation of the input shaft 51*a* is outputted to the output shaft 51*b* after being reduced in speed with the direction of rotation being the same.

Figure 8:
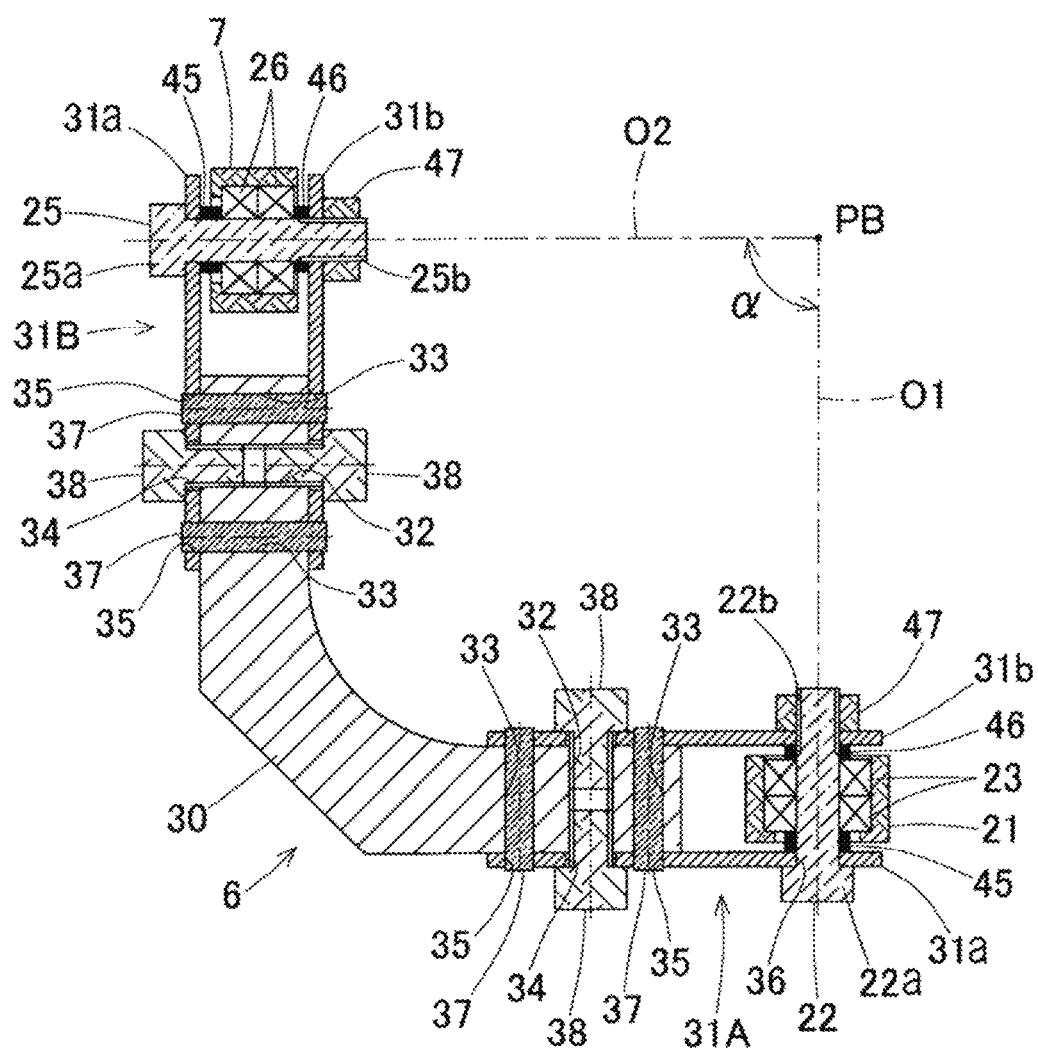
FIG. 8 is a partial view of FIG. 7.

As shown in FIG. 8, the link-hub-side rotational connection portion 31A of the distal-side end link member 6 has the rotational support member 21 disposed between the pair of outer and inner rotational connection bodies 31*a* and 31*b*. The end link member 6 and the rotational support member 21 are pivotably coupled to each other via the rotary shaft 22. Specifically, the connection is made as follows.

The rotary shaft 22 has, at the outer-diameter end thereof, a head portion 22*a* having a larger diameter than the remaining portion, and has, at the inner-diameter end thereof, a male thread portion 22*b*. In order from the male thread portion 22*b* side, the rotary shaft 22 is inserted in the through holes of the outer rotational connection body 31*a*, a spacer 45, inner rings of the two bearings 23, a spacer 46, and the inner rotational connection body 31*b*, and a nut 47 is screwed onto the male thread portion 22*b*. Accordingly, the pair of rotational connection bodies 31*a* and 31*b*, the inner rings of the two bearings 23, and the two spacers 45 and 46 are sandwiched between the nut 47 and the head portion 22*a* of the rotary shaft 22, so that the end link member 6 and the rotational support member 21 are pivotably coupled to each other in a state where preload is applied to the bearings 23.

As shown in FIG. 5 (FIG. 8), in the center-link-side rotational connection portion 31B of the end link member 5 (6), the one end (the other end) of the center link member 7 is disposed between the pair of outer and inner rotational connection bodies 31*a* and 31*b*. The end link member 5 (6) and the center link member 7 are pivotably coupled to each other via the rotary shaft 15 (25). Specifically, the connection is made as follows.

The rotary shaft 15 (25) has, at the outer-diameter end thereof, a head portion 15*a* (25*a*) having a larger diameter than the other portion, and has, at the inner-diameter end thereof, a male thread portion 15*b* (25*b*). In order from the male thread portion 15*b* (25*b*) side, the rotary shaft 15 (25) is inserted into the through holes of the outer rotational connection body 31*a*, the spacer 45, the inner rings of the two bearings 16 (26), the spacer 46, and the inner rotational connection body 31*b*, and the nut 47 is screwed onto the male thread portion 15*b* (25*b*). Accordingly, the pair of rotational connection bodies 31*a* and 31*b*, the inner rings of the two bearings 16 (26), and the two spacers 45 and 46 are sandwiched between the nut 47 and the head portion 15*a* (25*a*) of the rotary shaft 15 (25), so that the end link member 5 (6) and the center link member 7 are pivotably coupled to each other in a state where preload is applied to the bearings 16 (26).

This link operating device actuates the parallel link mechanism 1 by rotationally driving each position-controlling actuator 50. Specifically, when the position-controlling actuator 50 is rotationally driven, rotation thereof is reduced in speed via the speed reduction mechanism 51 and transmitted to the inner rotational connection body 31*b* of the link-hub-side rotational connection portion 31A of the proximal-side end link member 5. Accordingly, the angle of the proximal-side end link member 5 is changed so that the position of the distal-end-side link hub 3 is changed relative to the proximal-end-side link hub 2. Since the parallel link mechanism 1 is configured such that the distal-end-side link hub 3 is connected to the proximal-end-side link hub 2 so as to be changeable in position relative thereto via the three quadric chain link mechanisms 4, the link operating device becomes compact but can be operated over a wide operating range with high accuracy and at high speed.

Since the end link member 5, 6 is bent at the bent portion 30, the entire link operating device can have a reduced dimension in the radial direction, whereby a compact configuration can be obtained. Each of the rotational connection portions 31A and 31B of the end link members 5 and 6 includes the pair of rotational connection bodies 31*a* and 31*b*. Since each of the rotational connection bodies 31*a* and 31*b* is made of a metal sheet detachably attached to the bent portion 30, the rotational connection bodies 31*a* and 31*b* can be produced through sheet metal working at low cost with excellent mass productivity. By solely changing the size of the metal sheet used as the material, the rotational connection bodies 31*a* and 31*b* can be adapted to change in the size of the link operating device. Therefore, the size of the link operating device can be easily changed.

In addition, by dividing the end link member 5, 6 into two types of portions, i.e., the bent portion 30 and the rotational connection portions 31A, 31B, the shape of each portion can be simplified, whereby the working cost can be reduced and the mass productivity is improved. By forming the rotational connection bodies 31*a* and 31*b* of the rotational connection portions 31A and 31B in shapes that are identical with each other, the components can be shared, whereby the cost becomes low and the mass productivity becomes excellent. However, the thicknesses or the shapes of the rotational connection bodies 31*a* and 31*b* may be made different from each other in accordance with the locations at which the rotational connection bodies 31*a* and 31*b* are used and the strengths required for the rotational connection bodies 31*a* and 31*b*.

The revolute pair portion between the proximal-end-side link hub 2 and the proximal-side end link member 5 has the following operations and effects. Since the output shaft 51*b* of the speed reduction mechanism 51 is fixed to the inner rotational connection body 31*b* and the input shaft 51*a* of the speed reduction mechanism 51 is rotatably supported by the outer rotational connection body 31*a*, the speed reduction mechanism 51 can be disposed between the pair of rotational connection bodies 31*a* and 31*b*. Accordingly, the speed reduction mechanism 51 can be disposed so as not to project radially outward of the parallel link mechanism 1, whereby a further compact configuration can be obtained. That is, the speed reduction mechanism 51 having the input shaft 51*a* and the output shaft 51*b* arranged coaxially with each other, can be disposed without increasing the dimension in the radial direction of the link operating device. Besides, by disposing the speed reduction mechanism 51 between the pair of rotational connection bodies 31a and 31b, a configuration in which the speed reduction mechanism 51 connects the pair of rotational connection bodies 31a and 31b to each other can be obtained, and this configuration is advantageous in improving the rigidity.

Figure 10:
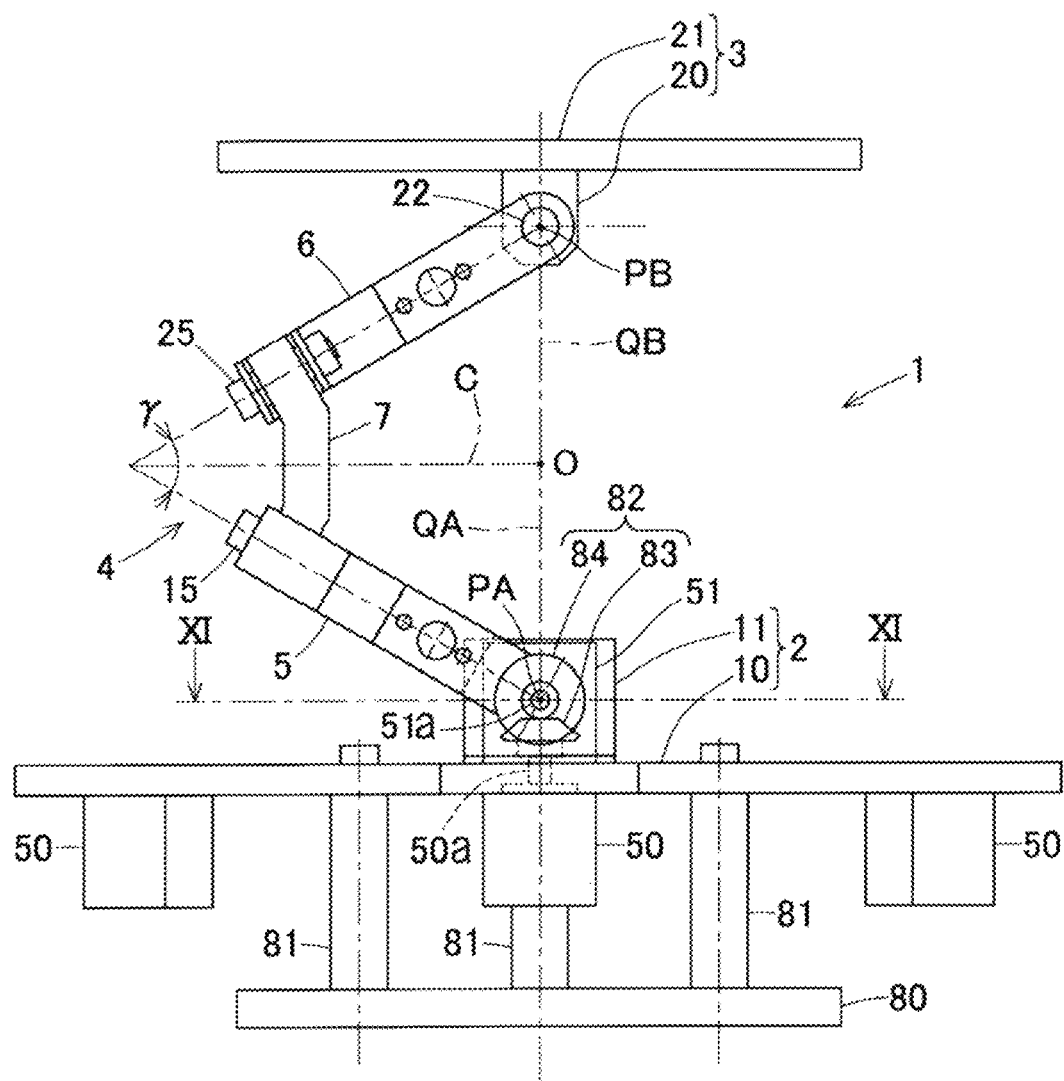
FIG. 10 is a front view of a link operating device according to another embodiment of the present invention, with a portion thereof being omitted.
Figure 11:
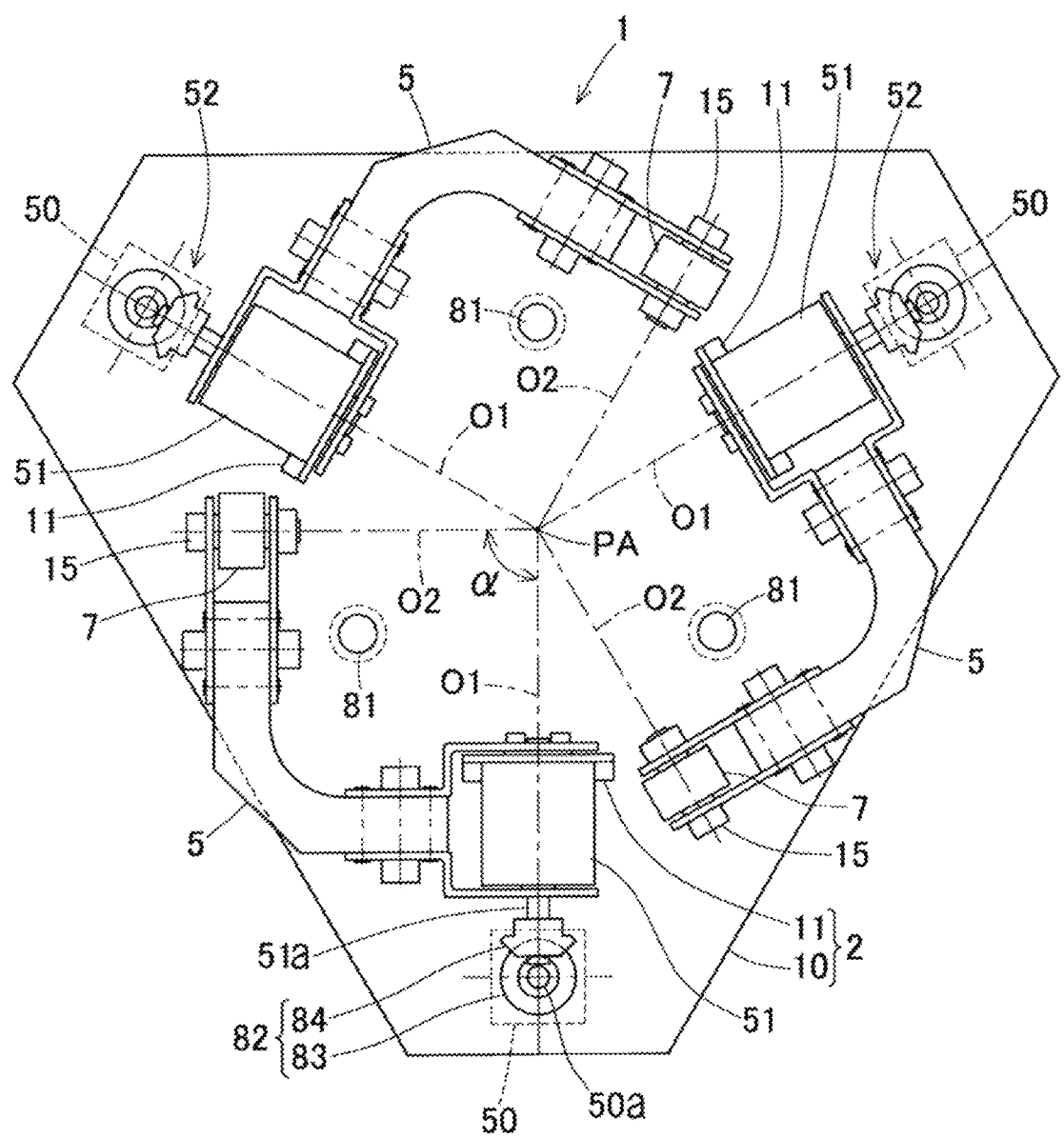
FIG. 11 is a cross-sectional view taken along a line XI-XI of FIG. 10.
Figure 12:
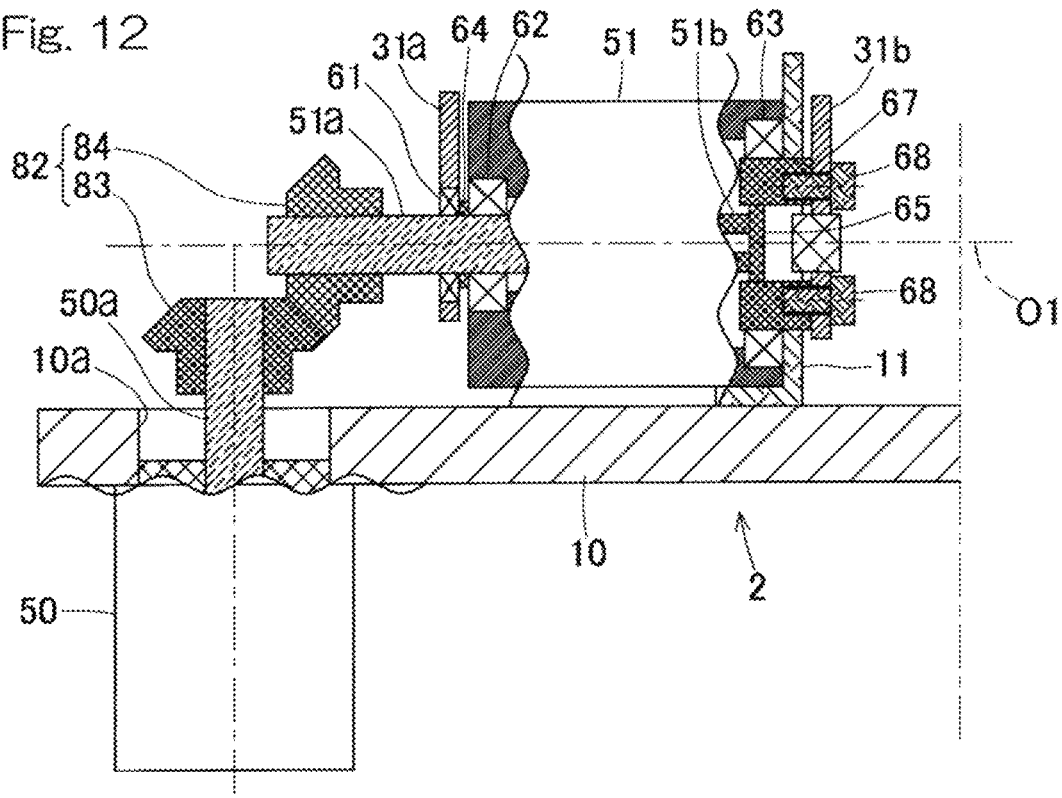
FIG. 12 is a cross-sectional view of an area at and around a gear mechanism of the link operating device.

FIGS. 10 to 12 show another embodiment of the present invention. This link operating device is different from that of the embodiment shown in FIG. 1, FIG. 4, and FIG. 5 in terms of the arrangement of the position-controlling actuator 50. Specifically, in the above-described embodiment, the rotational output shaft 50a of the position-controlling actuator 50 is formed integrally with, that is, serves as the input shaft 51a of the speed reduction mechanism 51, whereas, in the present embodiment, the rotational output shaft 50a of the position-controlling actuator 50 and the input shaft 51a of the speed reduction mechanism 51 are formed separately from each other and the axes of the rotational output shaft 50a of the position-controlling actuator 50 and the input shaft 51a of the speed reduction mechanism 51 are positioned so as to be orthogonal to each other.

As shown in FIG. 10, in the link operating device according to the present embodiment, the proximal end member 10 is supported by the upper ends of a plurality of supporting columns 81 disposed on a base plate 80. As shown in FIG. 12, the position-controlling actuator 50 is disposed so as to be fixed to the bottom surface of the proximal end member 10, and the rotational output shaft 50a of the position-controlling actuator 50 projects upward so as to penetrate the proximal end member 10 through an opening 10a thereof. The rotational output shaft 50a extending in the up/down direction is connected to the input shaft 51a, extending in the horizontal direction, of the speed reduction mechanism 51 via a gear mechanism 82. The gear mechanism 82 includes a drive-side bevel gear 83 attached to the rotational output shaft 50a, and a driven-side bevel gear 84 attached to the input shaft 51a.

By arranging, as described above, the position-controlling actuator 50 such that the axes of the rotational output shaft 50a of the position-controlling actuator 50 and the input shaft 51a of the speed reduction mechanism 51 are orthogonal to each other, a configuration in which other component parts are not disposed on the periphery of the revolute pair formed between the proximal-end-side link hub 2 and the proximal-side end link member 5 can be obtained, whereby the parallel link mechanism 1 can have a wide motion range. The other components are the same as those in the above-described embodiment.

In this link operating device, the center axis O1 of the revolute pair portion between the proximal-end-side link hub 2 and the proximal-side end link member 5, and the output shaft 50a of the position-controlling actuator 50, are located on opposite sides with respect to the proximal end member 10. Accordingly, a configuration can be obtained in which the position-controlling actuator 50 or a part provided along with the position-controlling actuator 50 is not disposed near the revolute pair portion between the proximal-end-side link hub 2 and the proximal-side end link member 5. Thus, the position-controlling actuator 50 and the parallel link mechanism 1 are less likely to interfere with each other, whereby the parallel link mechanism 1 can have a reduced dimension in the radial direction but can have a wide motion range. In addition, since the position-controlling actuator 50 is located as described above, no component of the parallel link mechanism 1 is present on a surface, of the proximal end member 10, on a side opposite to the side where each link mechanism 4 is present, whereby the degree of freedom in designing regarding the disposition of the position-controlling actuator 50 is high. The other components are the same as those in the above-described embodiment.

Figure 13:
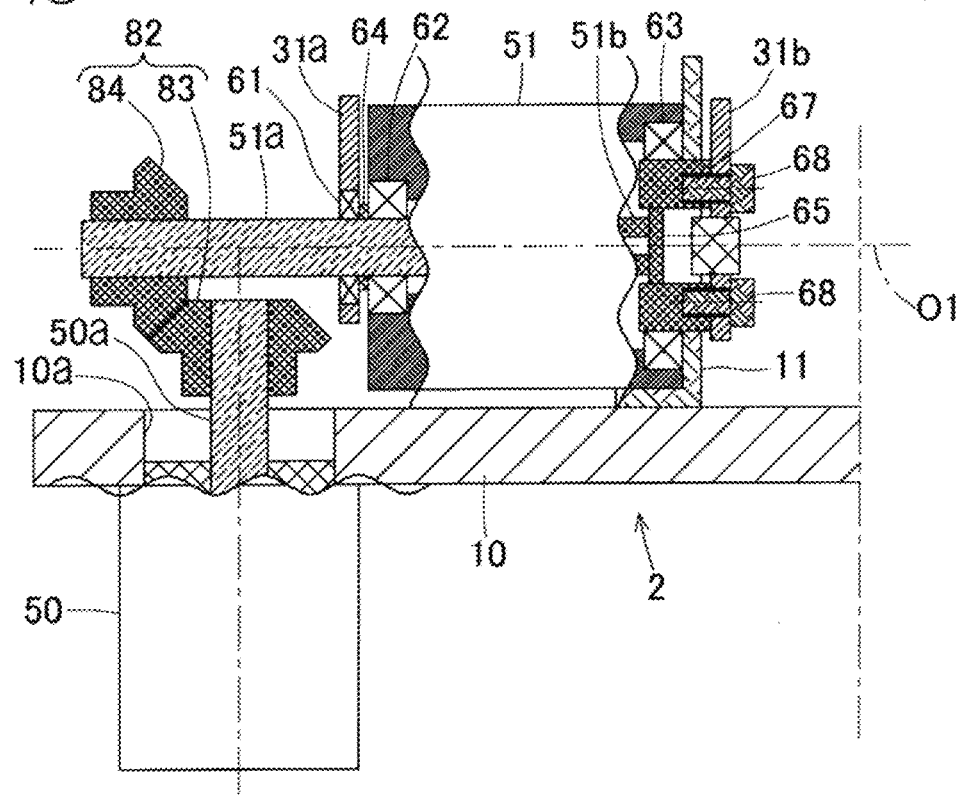
FIG. 13 is a cross-sectional view showing another configuration of the gear mechanism.

The gear mechanism 82 shown in FIG. 12 is configured such that the driven-side bevel gear 84 is located on the inner side relative to the drive-side bevel gear 83. However, as shown in FIG. 13, the gear mechanism 82 may be configured such that the driven-side bevel gear 84 is located on the outer side relative to the drive-side bevel gear 83. In the configuration in FIG. 13, the position-controlling actuator 50 can be disposed closer to the center in the radial direction than in the configuration in FIG. 12, whereby the parallel link mechanism 1 can be made compact.

Figure 14:
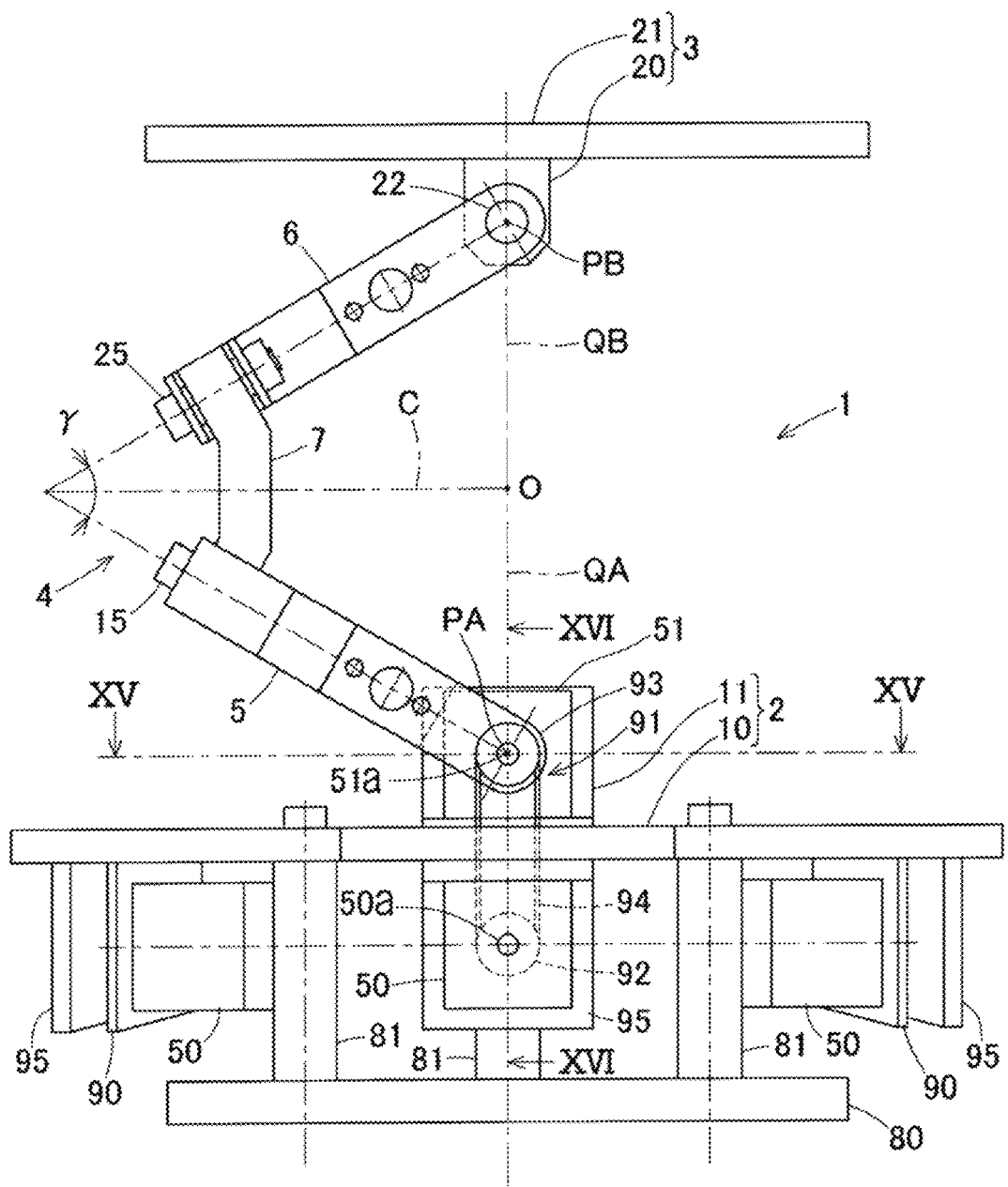
FIG. 14 is a front view of a link operating device according to still another embodiment of the present invention, with a portion thereof being omitted.
Figure 15:
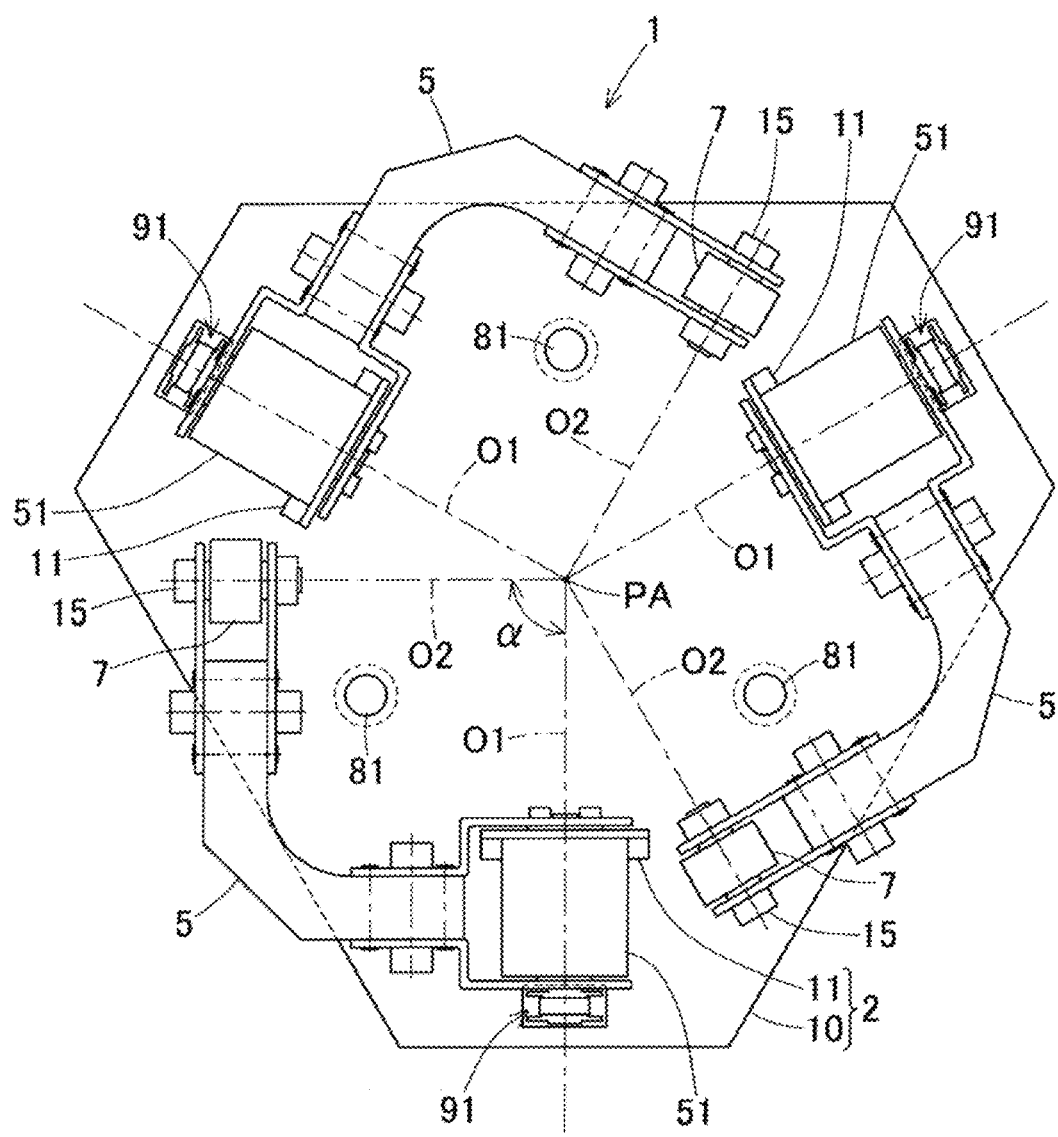
FIG. 15 is a cross-sectional view taken along a line XV-XV in FIG. 14.
Figure 16:
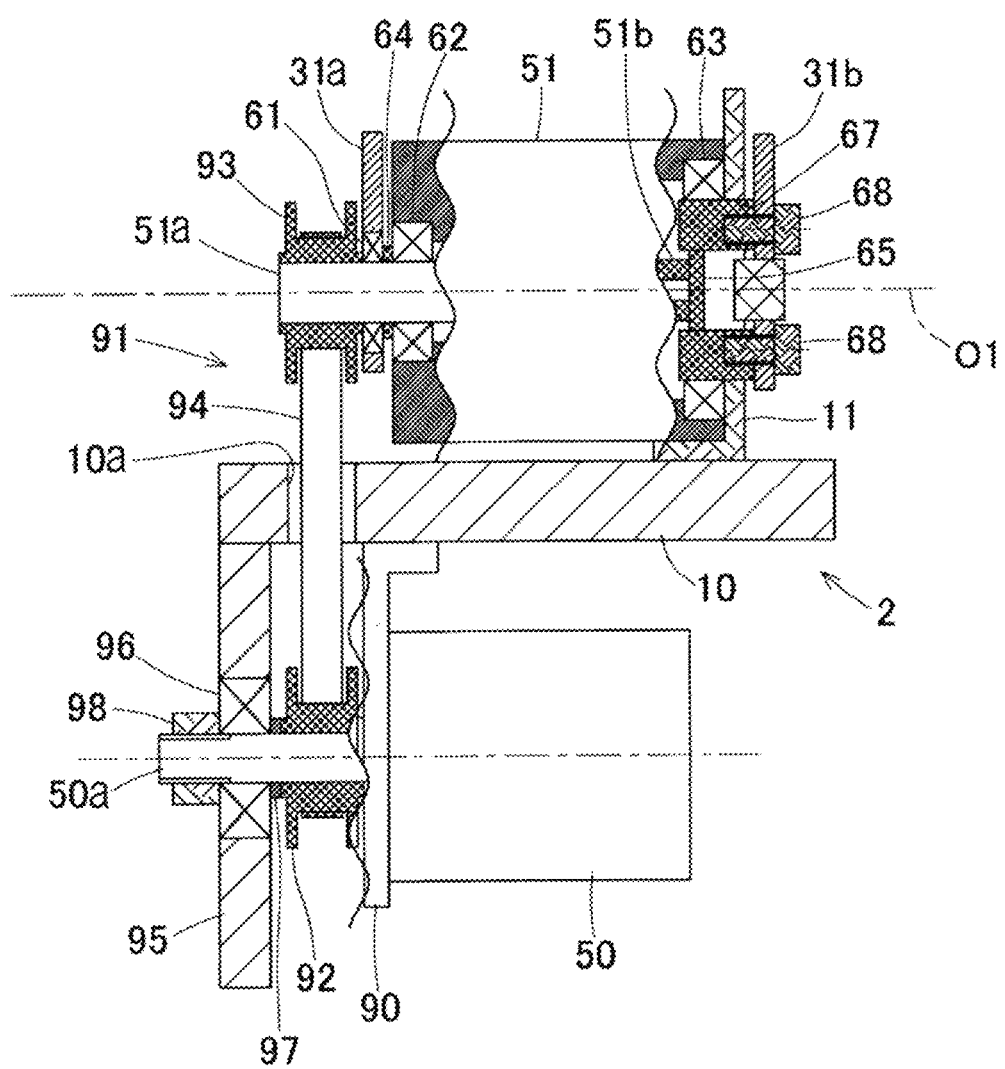
FIG. 16 is a cross-sectional view of an area at and around a power-transmitting mechanism of the link operating device.
Figure 17:
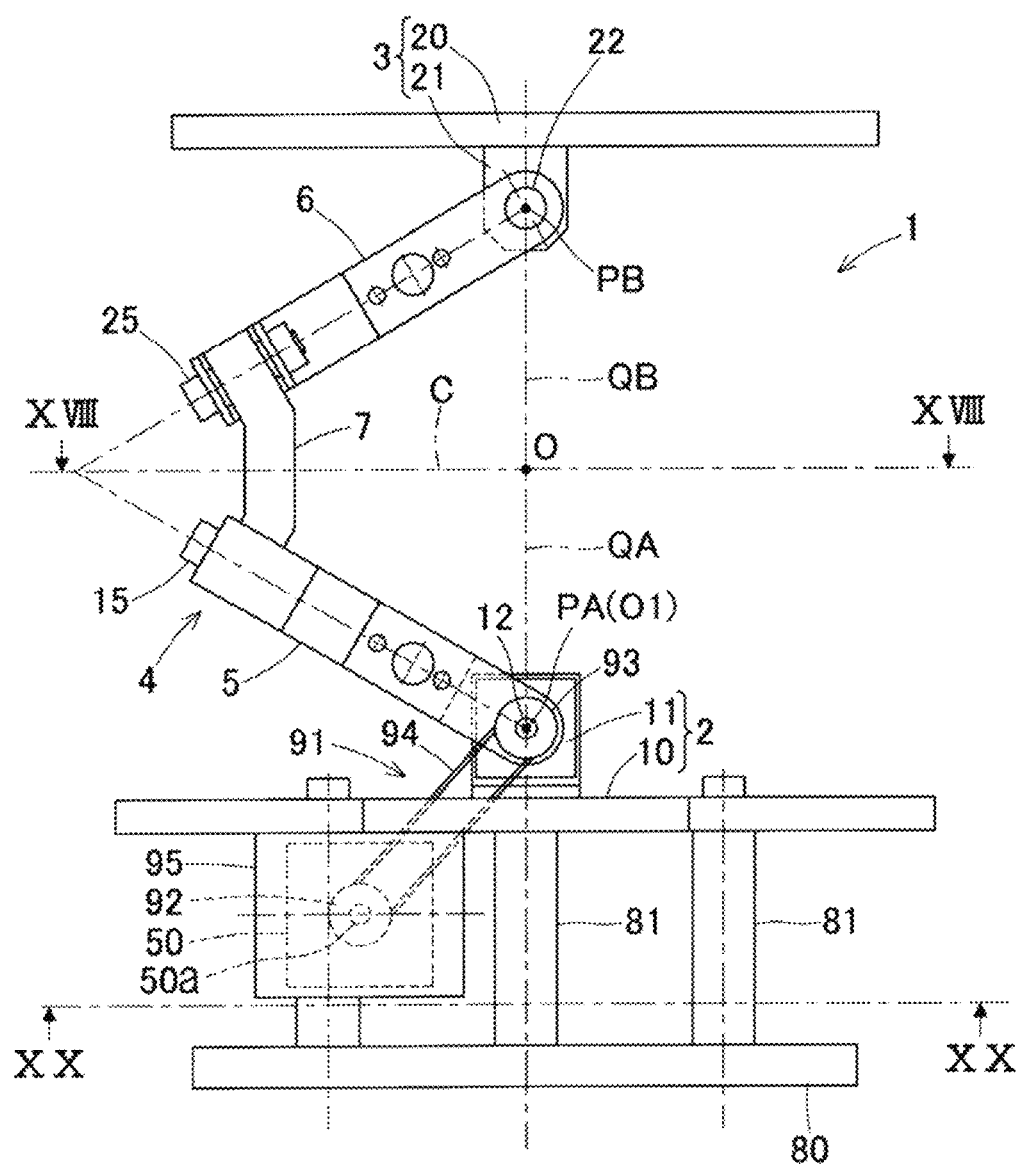
FIG. 17 is a front view of a link operating device according to a fifth embodiment of the present invention, with a portion thereof being omitted.

FIGS. 14 to 16 show still another embodiment of the present invention. In this link operating device, the position-controlling actuator 50 is arranged such that the rotational output shaft 50a of the position-controlling actuator 50 is parallel to the input shaft 51a of the speed reduction mechanism 51. Rotation from the rotational output shaft 50a to the input shaft 51a is transmitted by a power-transmitting mechanism 91 of a belt-type.

Specifically, as shown in the entire view in FIG. 14, the proximal end member 10 is supported by the upper ends of the plurality of supporting columns 81 disposed on the base plate 80. As shown in FIG. 16 which is a cross-sectional view taken along a line XVI-XVI in FIG. 14, the position-controlling actuator 50 is disposed on an actuator support member 90 fixed to the bottom surface of the proximal end member 10, so as to have such a position that the rotational output shaft 50a becomes horizontal. The power-transmitting mechanism 91 includes a drive-side timing pulley 92 attached to the rotational output shaft 50a of the position-controlling actuator 50, a driven-side timing pulley 93 attached to the input shaft 51a of the speed reduction mechanism 51, and a timing belt 94 wound on both timing pulleys 92 and 93. The timing belt 94 passes through the opening 10a of the proximal end member 10.

A rotational output shaft support member 95 is disposed, in a suspended manner, on the bottom surface of the proximal end member 10. The rotational output shaft 50a of the position-controlling actuator 50 is rotatably supported by a bearing 96 provided to the rotational output shaft support member 95. The bearing 96 is axially positioned by a spacer 97 interposed between an inner ring (not shown) of the bearing 96 and the drive-side timing pulley 92, and by a nut 98 screwed onto a distal-end thread portion of the rotational output shaft 50a.

Also by arranging the position-controlling actuator 50 such that the rotational output shaft 50a of the position-controlling actuator 50 and the input shaft 51a of the speed reduction mechanism 51 are parallel to each other as described above, a configuration in which other component parts are not disposed on the periphery of the revolute pair formed between the proximal-end-side link hub 2 and the proximal-side end link member 5 can be obtained, whereby the parallel link mechanism 1 can have a wide motion range. The power-transmitting mechanism 91 does not necessarily have to be configured by using the timing belt 94.

Since the proximal end member 10 is flat-plate-shaped, the plurality of rotational support members 11 can be disposed on the proximal end member 10 without increasing the dimension of the proximal end member 10, in a direction along the center axis QA of the proximal-end-side link hub 2. In addition, since the output shaft 50a of the position-controlling actuator 50 is parallel to the proximal end member 10, the output shaft 50a of the position-controlling actuator 50 can be disposed close to the proximal end member 10 as a whole. Furthermore, since the center axis O1 of the revolute pair portion between the proximal-end-side link hub 2 and the proximal-side end link member 5 is parallel to the proximal end member 10, the center axis O1 can be located close to the proximal end member 10 as a whole. With these features, it is possible to reduce the dimension, of the entire link operating device, in a direction along the center axis QA of the proximal-end-side link hub 2. As described above, the entire proximal end member 10 does not have to be flat-plate-shaped. Even when the proximal end member 10 is not flat-plate-shaped, the present invention can be implemented as long as a mounting surface of the proximal end member 10, on which the plurality of rotational support members 11 are arranged is parallel to the output shaft 50a and/or the center axis O1 of the revolute pair portion.

In addition, the actuator support member 90 is positioned so as to be slightly shifted to the inner diameter side from the outer circumferential edge of the bottom surface of the proximal end member 10, and the position-controlling actuator 50 is attached to the inner surface of the actuator support member 90. The output shaft 50a of the position-controlling actuator 50 extends toward the outer diameter side. The actuator rotational support member 95 is disposed on the outer circumferential edge of the bottom surface of the proximal end member 10, and the output shaft 50a is rotatably supported by the actuator rotational support member 95 via the bearing 96.

By disposing the position-controlling actuators 50 inward as described above, the dimension in the radial direction of an area in which the position-controlling actuators 50 are disposed is reduced, whereby a compact configuration can be obtained. Specifically, each position-controlling actuator 50 can be prevented from projecting to the outer diameter side relative to the proximal end member 10 by being disposed within a range below the proximal end member 10. The other components are the same as those in the above-described embodiment.

As shown in FIGS. 17 to 20, in this link operating device, the position-controlling actuator 50 may be disposed such that the output shaft 50a thereof is parallelly offset from a plane formed by the center axis QA of the proximal-end-side link hub 2 and the center axis O1 of the revolute pair formed between the proximal-end-side link hub 2 and the proximal-side end link member 5.

By disposing the position-controlling actuators 50 in an offset manner as described above, the position-controlling actuators 50 can be prevented from interfering with each other even if the position-controlling actuators 50 are long in the axial directions of the output shafts 50a. In addition, a wide space 78 for allowing a wire or the like to pass therethrough can be secured at a center portion in the radial direction of the area in which the position-controlling actuators 50 are disposed. The through hole 10a of the proximal end member 10 is made accordingly large. The other components are the same as those in the third embodiment.

Figure 18:
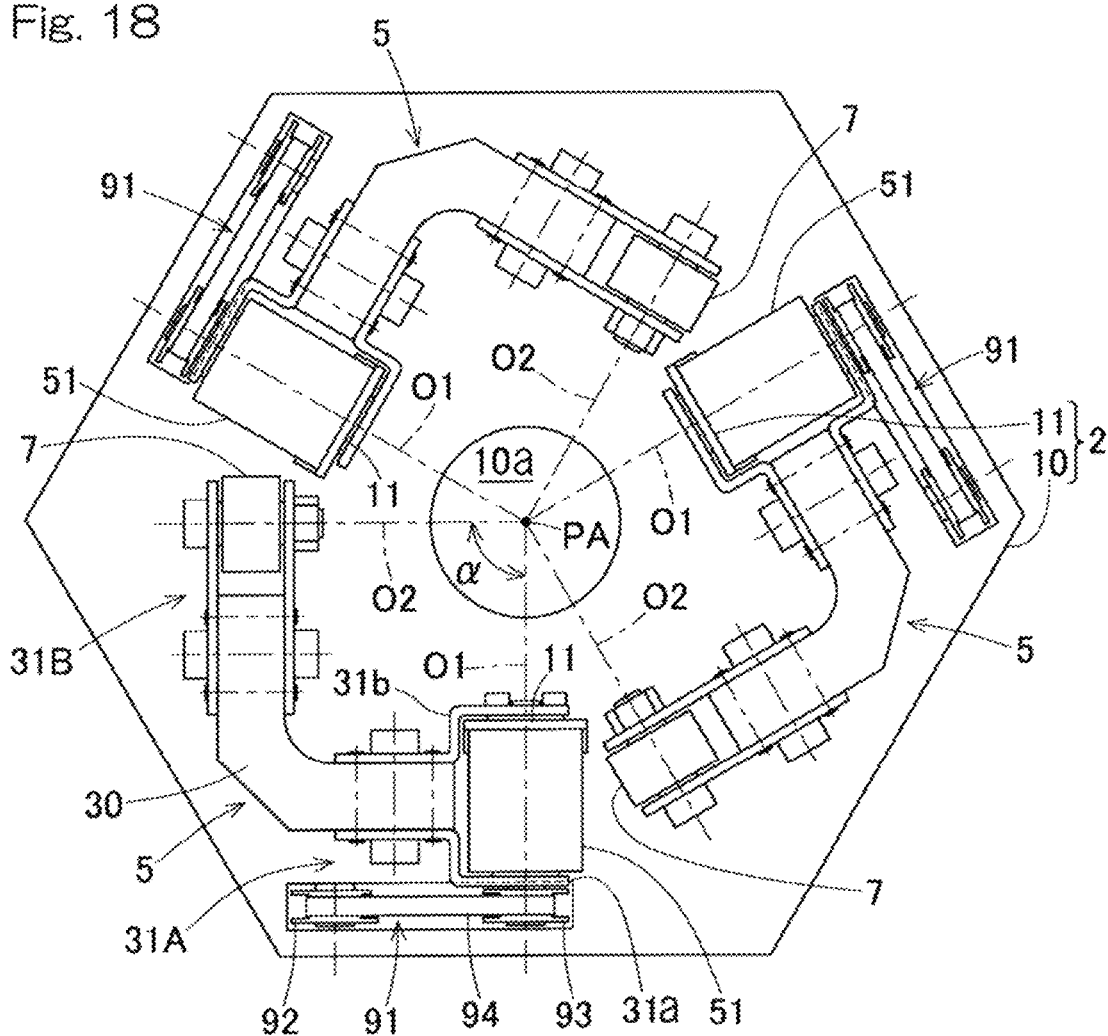
FIG. 18 is a cross-sectional view taken along a line XVIII-XVIII in FIG. 17.
Figure 19:
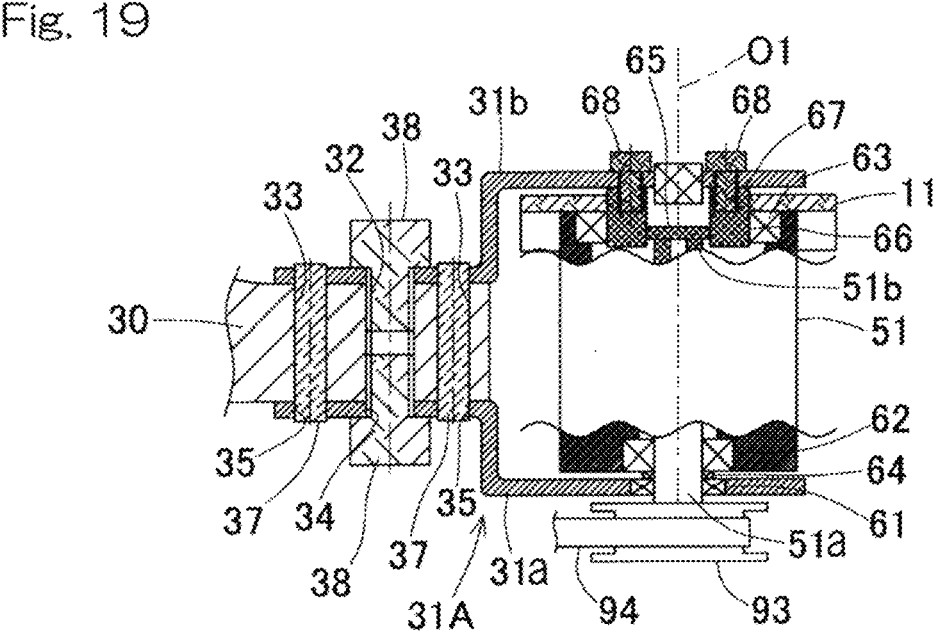
FIG. 19 is a partial cross-sectional view of FIG. 18.
Figure 20:
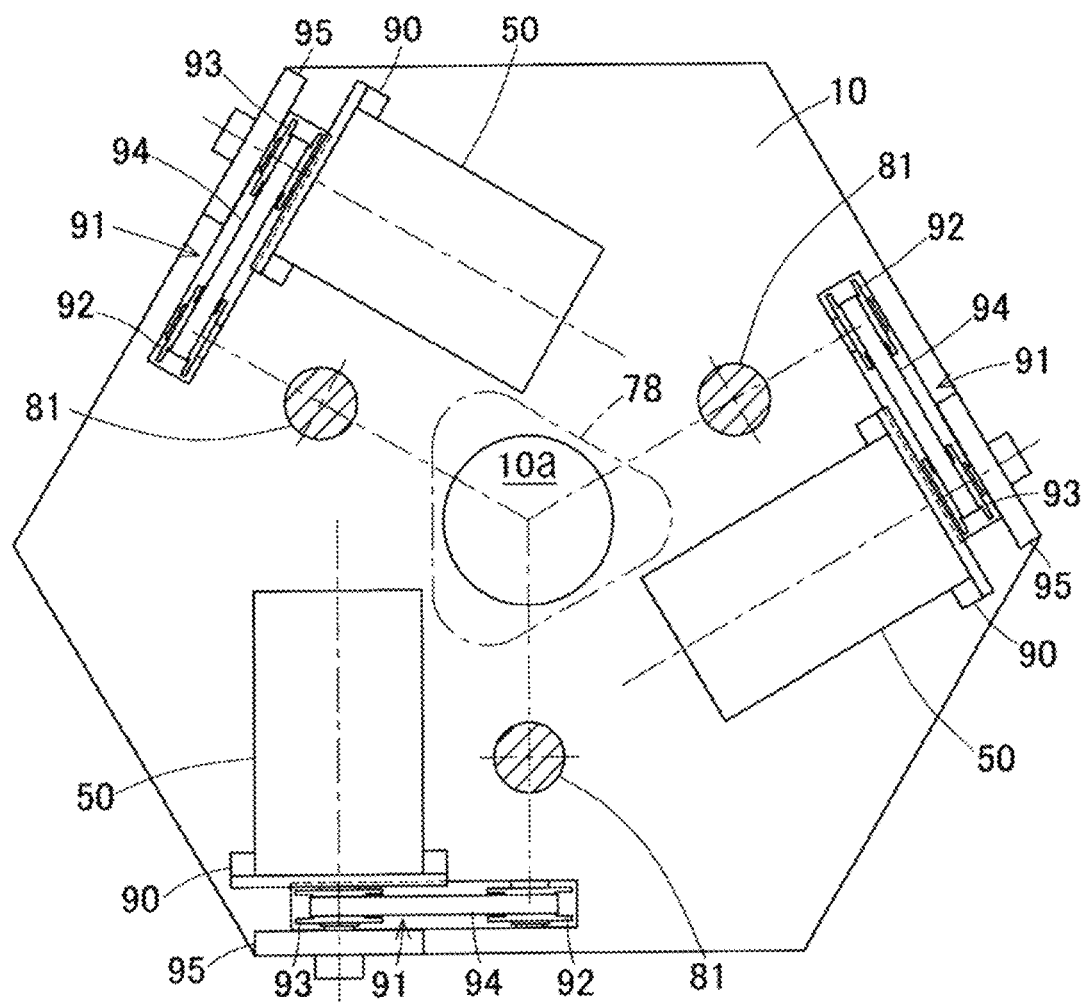
FIG. 20 is a cross-sectional view taken along a line XX-XX in FIG. 17.

In addition, as shown in FIG. 18, the center of the circle on which the three rotational support members 11 are disposed, is located on the center axis QA of the proximal-end-side link hub 2. In the proximal end member 10, the through hole 10a may be formed at a center portion around which the rotational support members 11 are arranged. Also the center of the through hole 10a is located on the center axis QA of the proximal-end-side link hub 2.

Since the through hole 10a is formed at the center portion, of the proximal end member 10, around which the plurality of rotational support members 11 are arranged, a wire or the like can be passed in the through hole 10a, whereby the wire or the like can be easily routed.

Figure 21:
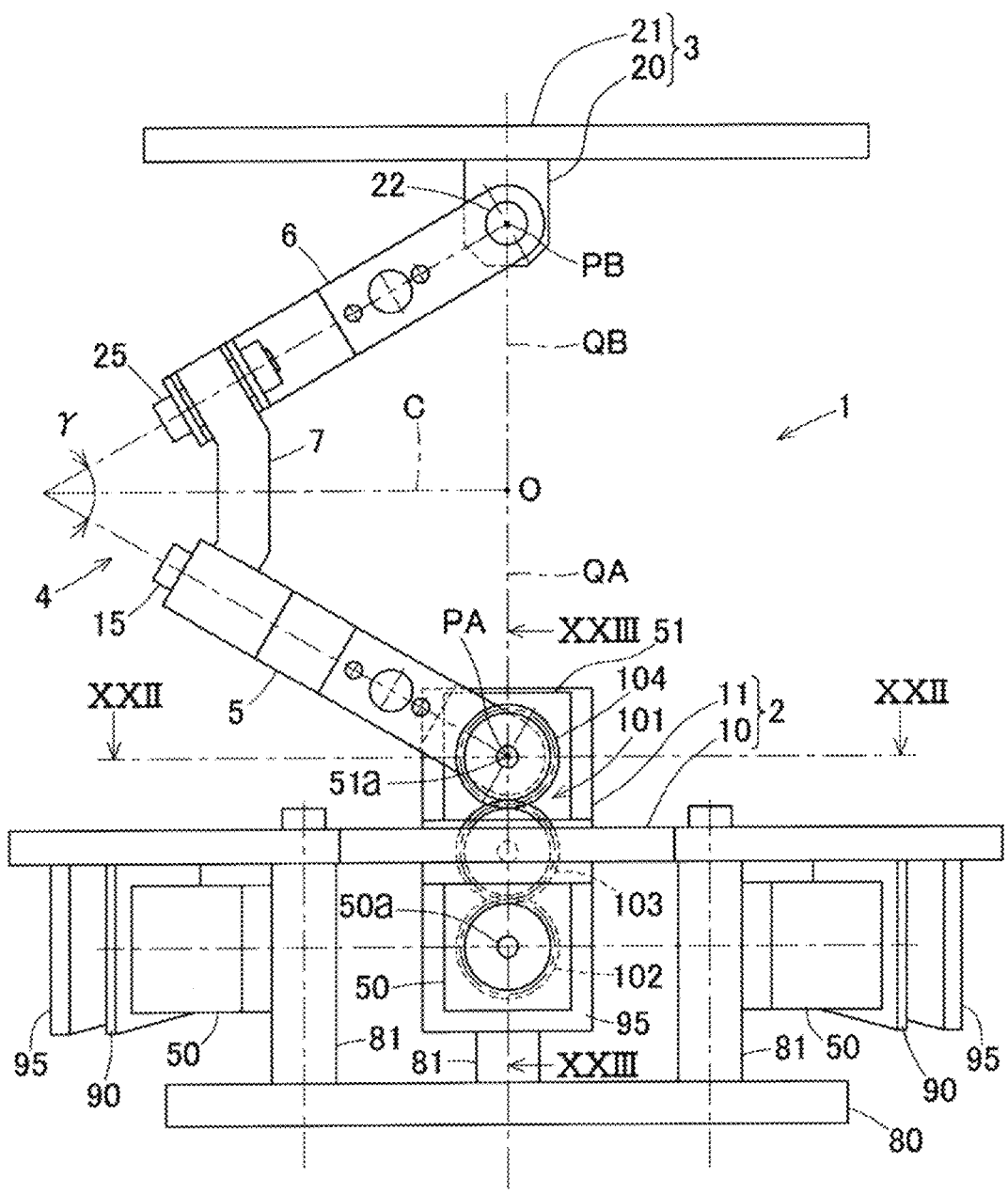
FIG. 21 is a front view of a link operating device according to still another embodiment of the present invention, with a portion thereof being omitted.
Figure 22:
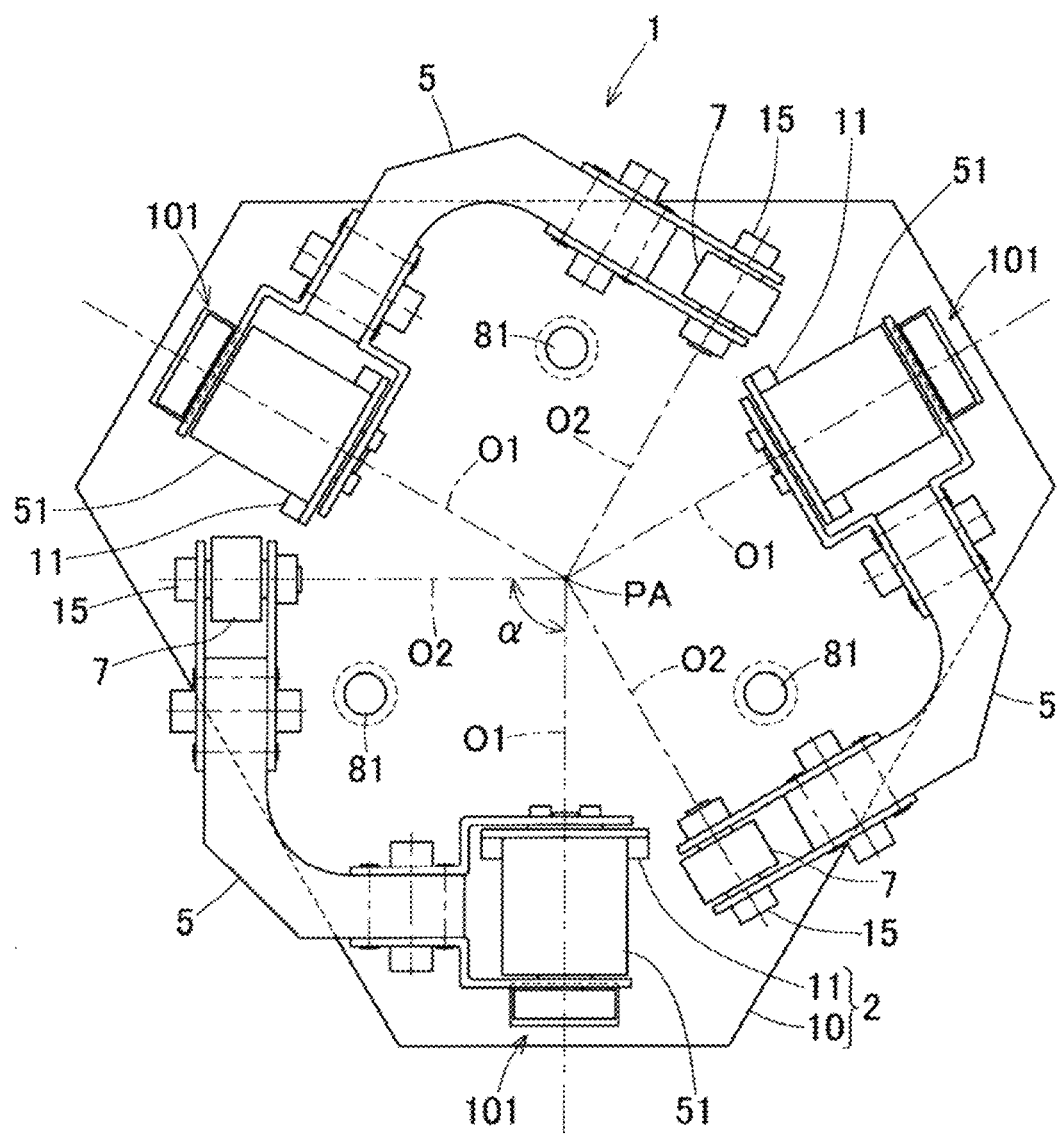
FIG. 22 is a cross-sectional view taken along a line XXII-XXII in FIG. 21.
Figure 23:
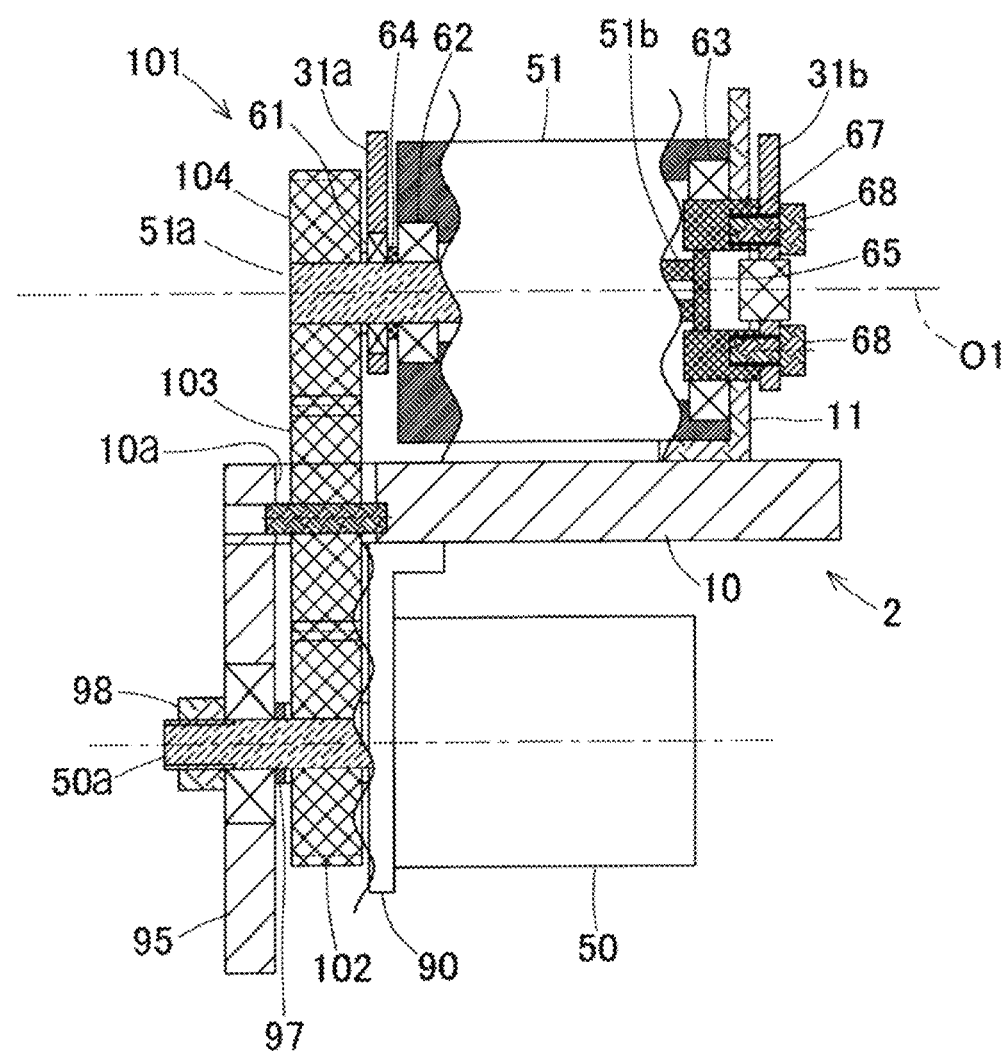
FIG. 23 is a cross-sectional view of an area at and around a power-transmitting mechanism of the link operating device.

FIGS. 21 to 23 show still another embodiment of the present invention. Also in this link operating device, the position-controlling actuator 50 is arranged such that the rotational output shaft 50a of the position-controlling actuator 50 is parallel to the input shaft 51a of the speed reduction mechanism 51, as in the embodiment in FIG. 14 to FIG. 16. The present embodiment is different from the embodiment in FIG. 14 to FIG. 16 in that the transmission of the rotation from the rotational output shaft 50a to the input shaft 51a is performed via a geared power-transmitting mechanism 101.

The position-controlling actuator 50 is disposed on the actuator support member 90 so as to have such a position that the rotational output shaft 50a becomes horizontal, as in the embodiment in FIG. 14 to FIG. 16. The geared power-transmitting mechanism 101 includes a drive gear 102 attached to the rotational output shaft 50a of the position-controlling actuator 50, a counter gear 103 disposed in the opening 10a of the proximal end member 10, and a driven gear 104 attached to the input shaft 51a of the speed reduction mechanism 51. Each of the gears 102, 103, and 104 is a spur gear.

Also in the case where a geared mechanism is used as the power-transmitting mechanism 101 as described above, the same operations and effects as those in the case where a belt-type mechanism is used, are obtained. Although the number of gears in the shown power-transmitting mechanism 101 is three, the number may be other than three. In addition, although rotation is transmitted from the rotational output shaft 50a of the position-controlling actuator 50 to the input shaft 51a of the speed reduction mechanism 51 with the same direction in the shown power-transmitting mechanism 101, the rotation may be transmitted with opposite directions. The other components are the same as those in the above-described embodiment.

Although the modes for carrying out the present invention have been described above on the basis of the embodiments, the embodiments disclosed herein are illustrative in all aspects and not restrictive. The scope of the present invention is indicated by the claims, rather than by the above description, and is intended to include any modifications within the scope and meaning equivalent to the claims.

Next, a link operating device according to an application mode which is not encompassed in the scope of the present invention will be described. The link operating device excludes the following constituent features: a feature in which the speed reduction mechanism is provided; a feature in which the proximal-side end link member includes the bent portion bent at an arbitrary angle, and the rotational connection portion disposed at one end of the bent portion and including the pair of rotational connection bodies arranged so as to be spaced from each other; a feature in which each speed reduction mechanism includes the input shaft and the output shaft coaxial with each other, and is disposed between the corresponding pair of rotational connection bodies such that the axes of the input shaft and the output shaft coincide with the center axis of the revolute pair formed between the proximal-end-side link hub and the proximal-side end link member; and a feature in which the output shaft of the speed reduction mechanism is fixed to one rotational connection body of the pair of rotational connection bodies, and the input shaft of the speed reduction mechanism is rotatably supported by the other rotational connection body of the pair of rotational connection bodies. The application mode includes the following modes 1 to 6. The link operating devices according to the application embodiments in the application mode can be operated over a wide operating range with high accuracy at high speed, has a reduced dimension in the radial direction, and has a high degree of freedom in designing regarding the disposition of the position-controlling actuator.

Mode 1

A link operating device in which: a distal-end-side link hub is connected to a proximal-end-side link hub so as to be changeable in position relative thereto via three or more link mechanisms; each link mechanism includes proximal-side and distal-side end link members having one ends pivotably coupled to the proximal-end-side link hub and the distal-end-side link hub, respectively, and a center link member having opposite ends pivotably coupled to the other ends of the proximal-side and distal-side end link members, respectively; and position-controlling actuators configured to arbitrarily change a position of the distal-end-side link hub relative to the proximal-end-side link hub are provided to two or more link mechanisms among the three or more link mechanisms, wherein the proximal-end-side link hub includes a proximal end member supporting each link mechanism, and a center axis of a revolute pair formed between the proximal-end-side link hub and each proximal-side end link member, and an output shaft of the corresponding position-controlling actuator, are disposed on opposite sides with respect to the proximal end member.

Mode 2

The link operating device according to mode 1, wherein the proximal-end-side link hub includes a plurality of rotational support members disposed so as to project from the proximal end member to a distal end side and rotatably supporting the respective proximal-side end link members, and the output shaft of each position-controlling actuator is parallel to a mounting surface of the proximal end member, on which the plurality of rotational support members are arranged.

Mode 3

The link operating device according to mode 1 or 2, wherein the proximal-end-side link hub includes a plurality of rotational support members disposed so as to project from the proximal end member to a distal end side and rotatably supporting the respective proximal-side end link members, and the center axis of the revolute pair formed between the proximal-end-side link hub and each proximal-side end link member is parallel to a mounting surface of the proximal end member, on which the plurality of rotational support members are arranged.

Mode 4

The link operating device according to any one of modes 1 to 3, wherein the proximal end member has a through hole at a center portion thereof around which the plurality of rotational support members are arranged.

Mode 5

The link operating device according to any one of modes 1 to 4, wherein each position-controlling actuator is disposed inward relative to the output shaft thereof.

Mode 6

The link operating device according to mode 5, wherein, in a case where a point at which the center axis of the revolute pair formed between the proximal-end-side link hub and each proximal-side end link member intersects with a center axis of a revolute pair formed between the proximal-side end link member and the corresponding center link member, is referred to as a proximal-end-side spherical link center, and a straight line that passes the proximal-end-side spherical link center and that intersects, at a right angle, with the center axis of the revolute pair formed between the proximal-end-side link hub and the proximal-side end link member, is referred to as a center axis of the proximal-end-side link hub, the corresponding position-controlling actuator is disposed such that the output shaft thereof is parallelly offset from a plane formed by the center axis of the proximal-end-side link hub and the center axis of the revolute pair formed between the proximal-end-side link hub and the proximal-side end link member.

The application embodiments in the application mode will be described with reference to the drawings. In the following description, matters common to the above-described embodiments of the present invention will not be described. In the accompanying drawings, the same reference numerals as those in the embodiments of the present invention denote identical or corresponding parts in the embodiments of the present invention.

First Application Embodiment

Figure 24:
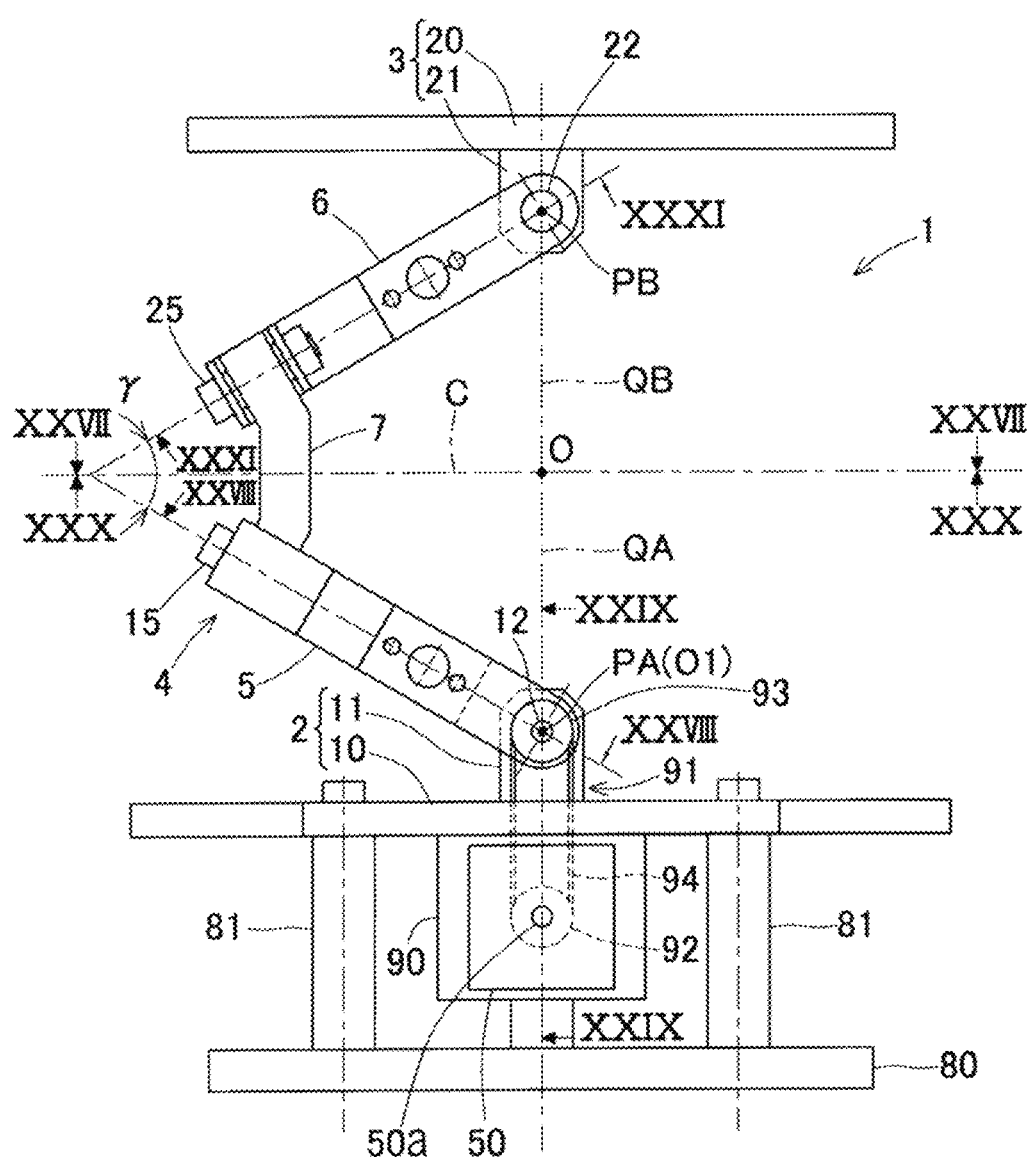
FIG. 24 is a front view of a link operating device according to a first application embodiment in an application mode of the present invention, with a portion thereof being omitted.

FIGS. 24 to 31 show a first application embodiment. FIG. 24 is a front view of the link operating device, with a portion thereof being omitted. This link operating device includes the parallel link mechanism 1 and the plurality of position-controlling actuators 50 which actuate the parallel link mechanism 1. In the link operating device shown in FIG. 24, the parallel link mechanism 1 is vertically supported by the upper ends of the plurality of supporting columns 81 disposed on the base plate 80.

Figure 25:
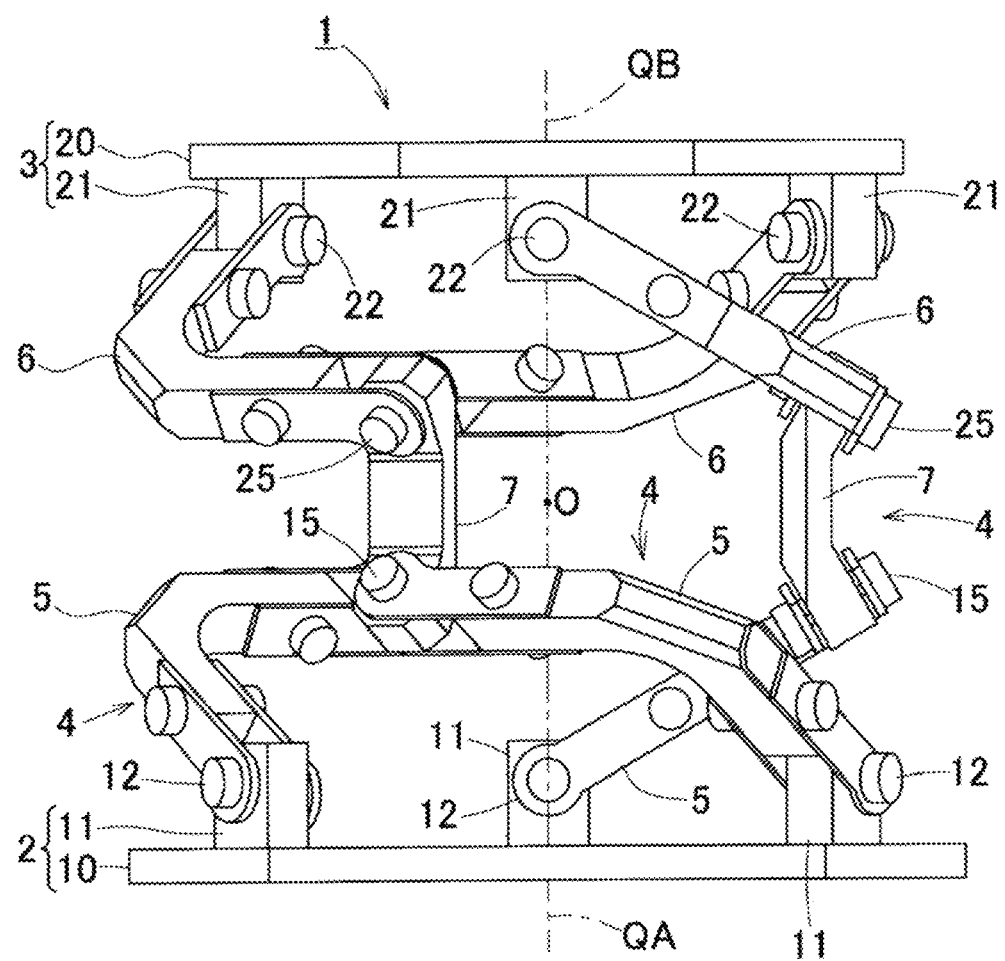
FIG. 25 is a view of a parallel link mechanism of the link operating device, in one state.
Figure 26:
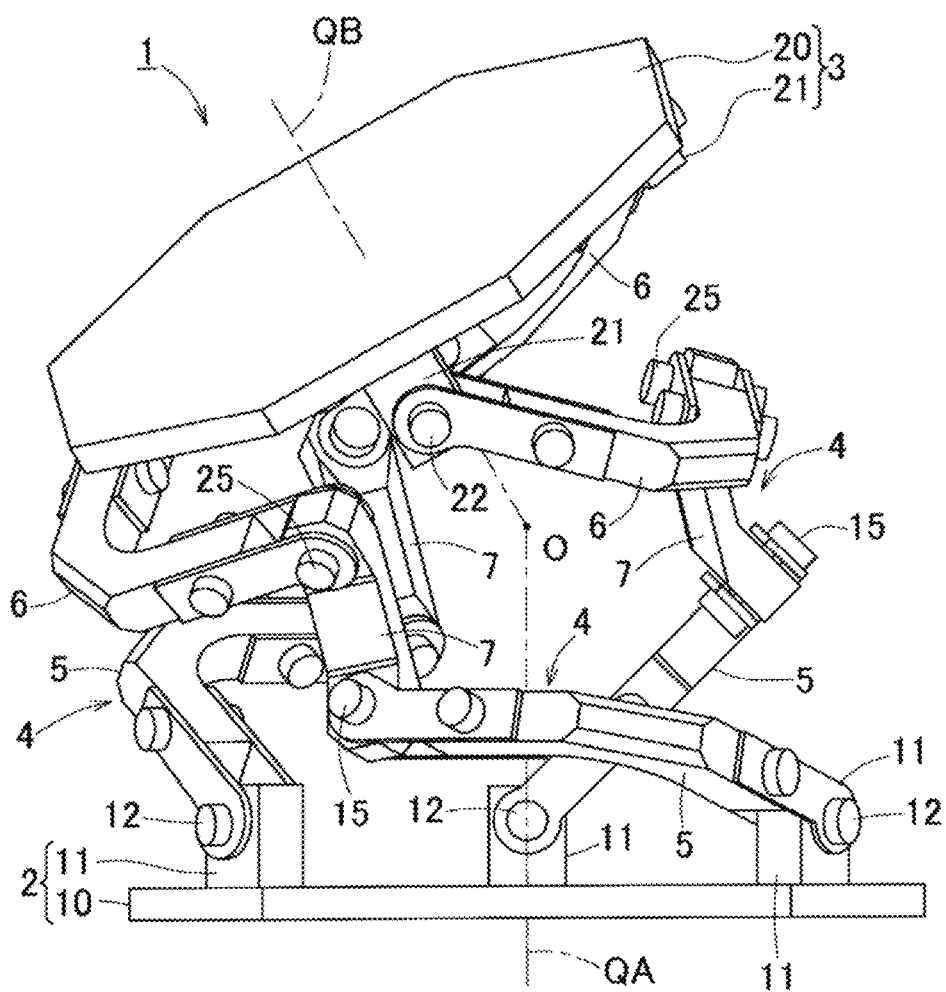
FIG. 26 is a view of the parallel link mechanism in another state.

FIG. 25 is a view of the parallel link mechanism 1 in one state. FIG. 26 is a view of the parallel link mechanism 1 in another state. FIG. 25 and FIG. 26 show states as seen from a direction opposite to the direction from which the link operating device is seen in FIG. 24. In the parallel link mechanism 1, the distal-end-side link hub 3 is connected to the proximal-end-side link hub 2 so as to be changeable in position relative thereto via the three link mechanisms 4. FIG. 24 shows only one of the link mechanisms 4. The number of the link mechanisms 4 may be four or more. FIG. 25 and FIG. 26 show a basic configuration of the parallel link mechanism 1, and, in a case where the link operating device is configured by mounting the position-controlling actuators 50 and the like thereon, a part of the parallel link mechanism 1 has a configuration different from that shown in the drawings.

In FIGS. 24 to 26, each link mechanism 4 includes the proximal-side end link member 5, the distal-side end link member 6, and the center link member 7, and is a quadric chain link mechanism including four revolute pairs. The proximal-side and distal-side end link members 5 and 6 are L-shaped, and have one ends pivotably coupled to the proximal-end-side link hub 2 and the distal-end-side link hub 3, respectively. The center link member 7 has opposite ends to which the other ends of the proximal-side and distal-side end link members 5 and 6 are pivotably coupled, respectively.

Figure 27:
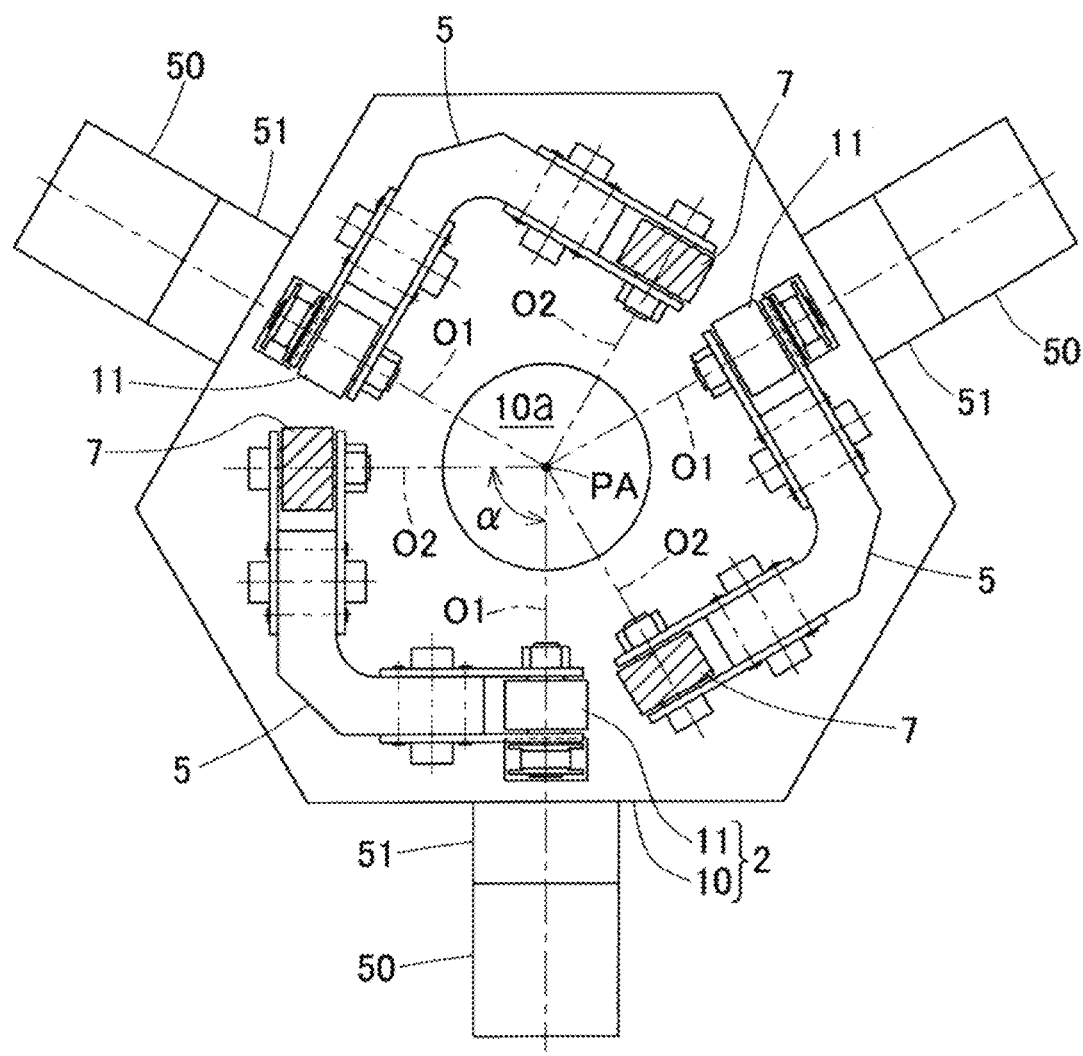
FIG. 27 is a cross-sectional view taken along a line XXVII-XXVII in FIG. 24.
Figure 30:
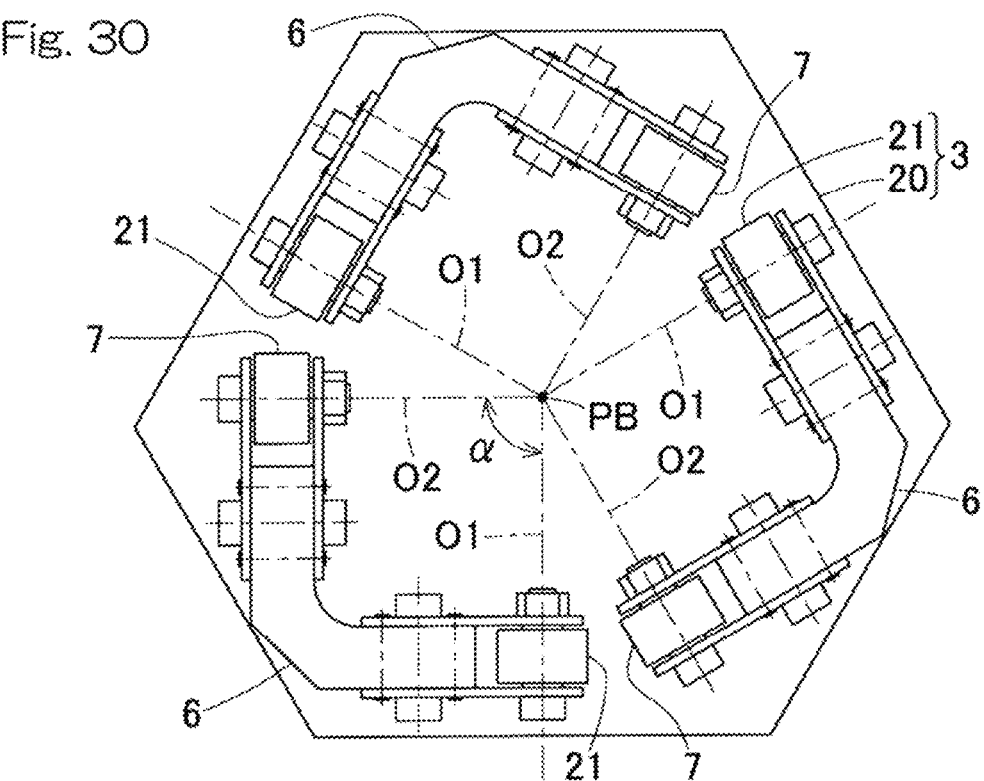
FIG. 30 is a cross-sectional view taken along a line XXX-XXX in FIG. 24.

FIG. 27 is a cross-sectional view taken along a line XXVII-XXVII in FIG. 24, and shows the relationship among: the center axes O1 of the respective revolute pairs between the proximal-end-side link hub 2 and the proximal-side end link members 5; the center axes O2 of the respective revolute pairs between the center link members 7 and the proximal-side end link members 5; and the proximal-end-side spherical link center PA. That is, a point at which the center axes O1 and the center axes O2 intersect with each other, is the proximal-end-side spherical link center PA. FIG. 30 is a cross-sectional view taken along a line XXX-XXX in FIG. 24, and shows the relationship among: the center axes O1 of the respective revolute pairs between the distal-end-side link hub 3 and the distal-side end link members 6; the center axes O2 of the respective revolute pairs between the center link members 7 and the distal-side end link members 6; and the distal-end-side spherical link center PB. That is, a point at which the center axes O1 and the center axes O2 intersect with each other, is the distal-end-side spherical link center PB. In the examples in FIG. 27 and FIG. 30, an angle α formed by the center axis O1 of each revolute pair formed between the link hub 2, 3 and the end link member 5, 6 and the center axis O2 of each revolute pair formed between the end link member 5, 6 and the center link member 7, is 90°. However, the angle α may be other than 90°.

As shown in FIGS. 24 to 27, the proximal-end-side link hub 2 includes the flat-plate-shaped proximal end member 10 supporting each link mechanism 4, and the three rotational support members 11 circumferentially equidistantly disposed on the proximal end member 10. In the shown example, the flat-plate-shaped proximal end member 10 is disposed such that the upper and lower surfaces thereof are horizontal, and the rotational support members 11 project upward from the upper surface of the proximal end member 10. As shown in FIG. 24, by connecting the upper ends of the supporting columns 81 to the bottom surface of the proximal end member 10, the parallel link mechanism 1 is supported by the base member 80. The proximal end member 10 does not have to be flat-plate-shaped.

As shown in FIG. 27, the center of the circle on which the three rotational support members 11 are disposed, is located on the center axis QA of the proximal-end-side link hub 2. In the proximal end member 10, the through hole 10*a* is formed at a center portion around which the rotational support members 11 are arranged. Also the center of the through hole 10*a* is located on the center axis QA of the proximal-end-side link hub 2.

Figure 28:
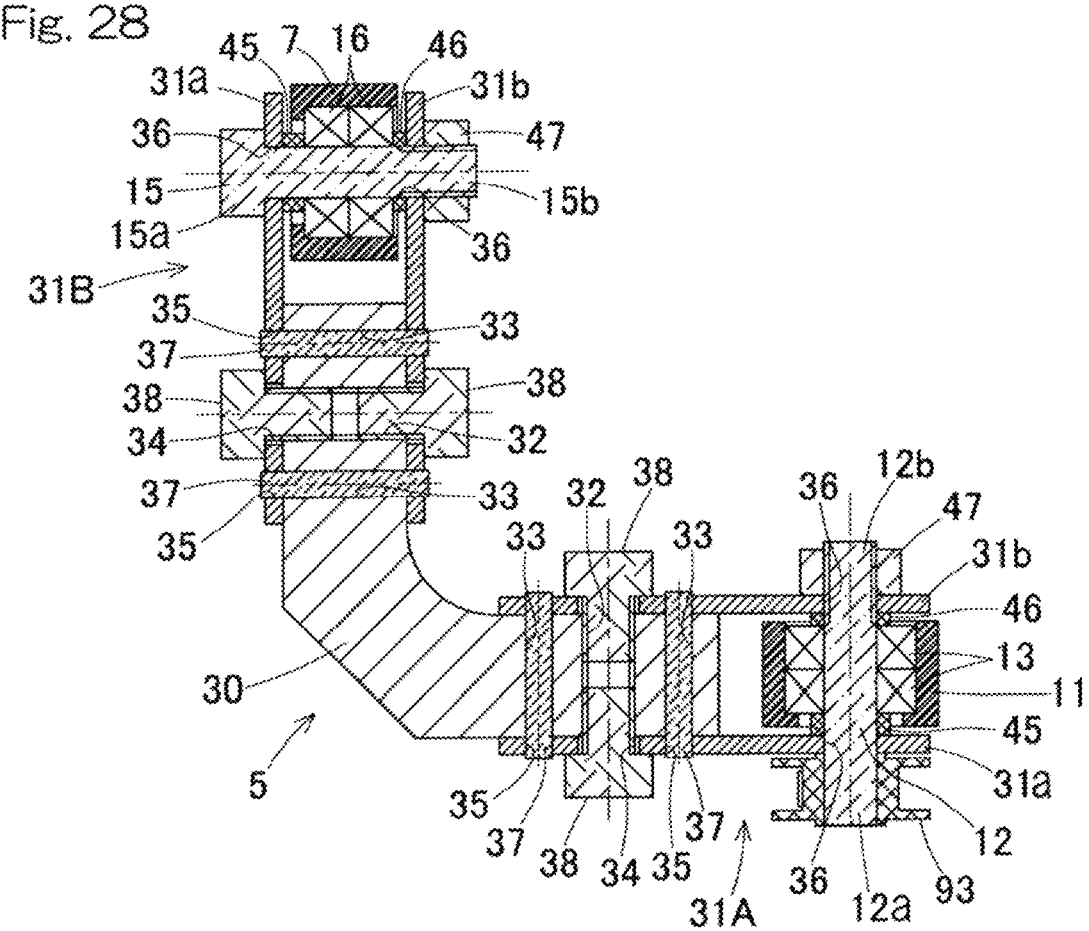
FIG. 28 is a cross-sectional view taken along a line XXVIII-XXVIII in FIG. 24.

As shown in FIG. 28 which is a cross-sectional view taken along a line XXVIII-XXVIII in FIG. 24, one end of each proximal-side end link member 5 is pivotably coupled to the corresponding rotational support member 11. Specifically, a rotary shaft 12 is rotatably supported by the rotational support member 11 via two bearings 13, and the one end of the proximal-side end link member 5 is connected to the rotary shaft 12.

The other end of the proximal-side end link member 5 is connected to one end of the center link member 7. Specifically, the rotary shaft 15 is rotatably supported by the center link member 7 via the two bearings 16, and the other end of the proximal-side end link member 5 is connected to the rotary shaft 15.

As the bearings 13, 16, ball bearings such as deep groove ball bearings or angular contact ball bearings are used, for example. These bearings 13, 16 are fixed to the rotational support member 11 or the center link member 7 by a method such as press-fitting, adhesion, or crimping. Instead of using the bearings 13, 16 as in this example, the rotary shaft 12, 15 may be made rotatably in contact with the rotational support member 11 or the center link member 7, thereby rotatably supporting the rotary shaft 12, 15. The types of the bearings provided to the other revolute pair portions, and methods for disposing these bearings, are the same as those described above.

As shown in FIGS. 24 to 26 and FIG. 30, the distal-end-side link hub 3 includes the flat-plate-shaped distal end member 20, and the three rotational support members 21 circumferentially equidistantly disposed on the distal end member 20. The center of the circle on which the three rotational support members 21 are disposed, is located on the center axis QB of the distal-end-side link hub 3. The distal end member 20 does not have to be flat-plate-shaped.

Figure 31:
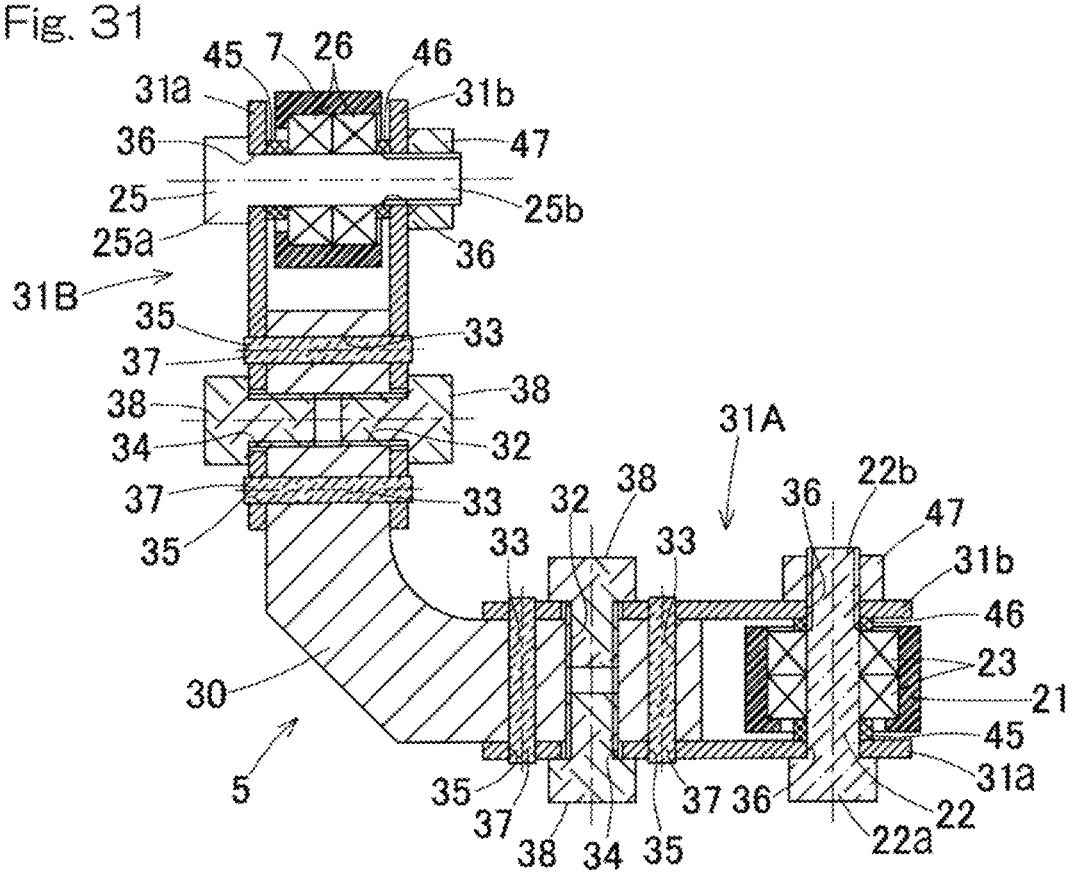
FIG. 31 is a cross-sectional view taken along a line XXXI-XXXI in FIG. 24.

As shown in FIG. 31 which is a cross-sectional view taken along a line XXXI-XXXI in FIG. 24, one end of each distal-side end link member 6 is pivotably coupled to the corresponding rotational support member 21. Specifically, the rotary shaft 22 is rotatably supported by the rotational support member 21 via the two bearings 23, and the one end of the distal-side end link member 6 is connected to the rotary shaft 22.

The other end of the distal-side end link member 6 is connected to the other end of the center link member 7. Specifically, the rotary shaft 25 is rotatably supported by the center link member 7 via the two bearings 26, and the other end of the distal-side end link member 6 is connected to the rotary shaft 25.

Next, the configurations of the end link members 5 and 6 will be described with reference to FIGS. 28 and 31. The proximal-side and distal-side end link members 5 and 6 have the same configuration except for some portions thereof. Here, the proximal-side end link member 5 will be described as a representative, and, as for the distal-side end link 6, reference numerals for the corresponding portions will be described in parentheses. Portions different in configuration between the proximal-side and distal-side end link members 5 and 6 will be described as necessary.

As shown in FIG. 28 (FIG. 31), the end link member 5 (6) includes the single bent portion 30, and the link-hub-side and center-link-side rotational connection portions 31A and 31B located on opposite ends of the bent portion 30. In the present application embodiment, each of the rotational connection portions 31A and 31B includes the pair of rotational connection bodies 31*a* and 31*b* respectively fixed to the outer surface and the inner surface of an end portion of the bent portion 30.

The bent portion 30 is, for example, a cast product made of a metal material, and has such a shape as to be bent at the predetermined angle α (see FIG. 27 and FIG. 30; 90° in this example). The bending angle α can be arbitrarily determined. At each end of the bent portion 30, the single bolt thread hole 32 is formed so as to penetrate from the outer surface to the inner surface, and the two positioning holes 33 are formed so as to be located on opposed sides of the bolt thread hole 32.

The rotational connection bodies 31*a* and 31*b* of the rotational connection portions 31A and 31B are each formed in a predetermined shape by performing working such as sheet metal working on a plate-shaped member having a uniform thickness such as a metal sheet. Each of the rotational connection bodies 31*a* and 31*b* has, for example, a thin and long linear shape, and is provided with the single bolt insertion hole 34 corresponding to the bolt thread hole 32 of the bent portion 30, the two positioning holes 35 corresponding to the positioning holes 33 of the bent portion 30, and the through hole 36 which allows any of the rotary shafts 12, 15, 22, and 25 to be inserted thereinto. By using a plate-shaped member having a simple shape and a uniform thickness as the material for the rotational connection bodies 31a and 31b, the rotational connection bodies 31a and 31b can be produced at low cost and the mass productivity thereof is excellent. In particular, by using a metal sheet as the material, working for the contour shape and the respective holes 34, 35, and 36 is easy.

In fixing the bent portion 30 and the rotational connection bodies 31a and 31b to each other, the positioning pins 37 are inserted through the positioning holes 33 of the bent portion 30 and the positioning holes 35 of the outer and inner rotational connection bodies 31a and 31b, to position the bent portion 30 and the rotational connection bodies 31a and 31b. In this state, the bolts 38 are inserted through the bolt insertion holes 34 of the respective rotational connection bodies 31a and 31b from the outer side and the inner side, respectively, such that thread portions of the bolts 38 are screwed into the bolt thread hole 32 of the bent portion 30. That is, the outer and inner rotational connection bodies 31a and 31b are individually fixed to the bent portion 30 by means of the bolts 38 different from each other, in a state of being positioned by the shared positioning pins 37. By using the positioning pins 37 as described above, assembling becomes easy and variation in accuracy of assembling among workers is reduced. In addition, the accuracy of the positional relationship between the bent portion 30 and the rotational connection bodies 31a and 31b is improved, whereby the parallel link mechanism 1 can be smoothly operated.

As shown in FIG. 28, in the link-hub-side rotational connection portion 31A of the proximal-side end link member 5, the rotational support member 11 is disposed between the pair of outer and inner rotational connection bodies 31a and 31b. The end link member 5 and the rotational support member 11 are pivotably coupled to each other via the rotary shaft 12. Specifically, the connection is made as follows.

The rotary shaft 12 has, at the outer-diameter end thereof, a pulley attachment portion 12a to which a timing pulley 93 (described later) is attached, and has, at the inner-diameter end thereof, a male thread portion 12b. In order from the male thread portion 12b side, the rotary shaft 12 is inserted in the through holes of the outer rotational connection body 31a, the spacer 45, the inner rings of the two bearings 13, the spacer 46, and the inner rotational connection body 31b, and the nut 47 is screwed onto the male thread portion 12b. Accordingly, the pair of rotational connection bodies 31a and 31b, the inner rings of the two bearings 13, and the two spacers 45 and 46 are sandwiched between the timing pulley 93 and the nut 47, so that the end link member 6 and the rotational support member 21 are pivotably coupled to each other in a state where preload is applied to the bearings 13. It is noted that the timing pulley 93 is rotatable relative to the outer rotational connection body 31a.

As shown in FIG. 31, in the link-hub-side rotational connection portion 31A of the distal-side end link member 6, the rotational support member 21 is disposed between the pair of outer and inner rotational connection bodies 31a and 31b. The end link member 6 and the rotational support member 21 are pivotably coupled to each other via the rotary shaft 22. Specifically, the connection is made as follows.

The rotary shaft 22 has, at the outer-diameter end thereof, the head portion 22a having a larger diameter than the other portion, and has, at the inner-diameter end thereof, the male thread portion 22b. In order from the male thread portion 22b side, the rotary shaft 22 is inserted in the through holes of the outer rotational connection body 31a, the spacer 45, the inner rings of the t wo bearings 23, the spacer 46, and the inner rotational connection body 31b, and the nut 47 is screwed onto the male thread portion 22b. Accordingly, the pair of rotational connection bodies 31a and 31b, the inner rings of the two bearings 23, and the two spacers 45 and 46 are sandwiched between the nut 47 and the head portion 22a of the rotary shaft 22, so that the end link member 6 and the rotational support member 21 are pivotably coupled to each other in a state where preload is applied to the bearings 23.

As shown in FIG. 28 (FIG. 31), in the center-link-side rotational connection portion 31B of the end link member 5 (6), the one end (the other end) of the center link member 7 is disposed between the pair of outer and inner rotational connection bodies 31a and 31b. The end link member 5 (6) and the center link member 7 are pivotably coupled to each other via the rotary shaft 15 (25). Specifically, the connection is made as follows.

The rotary shaft 15 (25) has, at the outer-diameter end thereof, the head portion 15a (25a) having a larger diameter than the other portion, and has, at the inner-diameter end thereof, the male thread portion 15b (25b). In order from the male thread portion 15b (25b) side, the rotary shaft 15 (25) is inserted in the through holes of the outer rotational connection body 31a, the spacer 45, the inner rings of the two bearings 16 (26), the spacer 46, and the inner rotational connection body 31b, and the nut 47 is screwed onto the male thread portion 15b (25b). Accordingly, the pair of rotational connection bodies 31a and 31b, the inner rings of the two bearings 16 (26), and the two spacers 45 and 46 are sandwiched between the nut 47 and the head portion 15a (25a) of the rotary shaft 15 (25), so that the end link member 5 (6) and the center link member 7 are pivotably coupled to each other in a state where preload is applied to the bearings 16 (26).

Figure 29:
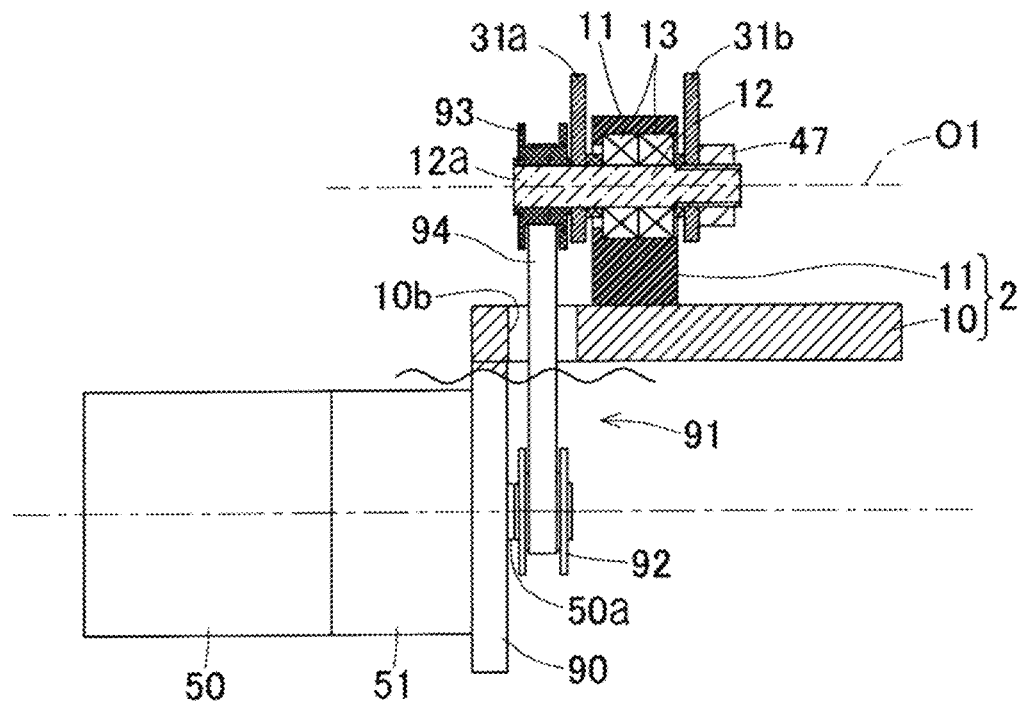
FIG. 29 is a cross-sectional view taken along a line XXIX-XXIX in FIG. 24.

FIG. 29 is a cross-sectional view taken along a line XXIX-XXIX in FIG. 24. The actuator support member 90 is disposed so as to project downward from the outer circumferential edge of the bottom surface of the proximal end member 10, and the position-controlling actuator 50 and the speed reduction mechanism 51 provided along therewith are attached to the outer surface of the actuator support member 90. Specifically, the position-controlling actuator 50 and the speed reduction mechanism 51 provided along therewith are attached to the actuator support member 90 at a portion of the speed reduction mechanism 51.

The position-controlling actuator 50 is a rotary motor, and the output shaft 50a thereof penetrates the actuator support member 90 so as to horizontally extend to the inner side relative to the actuator support member 90. Rotation is transmitted from the output shaft 50a of the position-controlling actuator 50 to the rotary shaft 12 by the belt-type power-transmitting mechanism 91. The belt-type power-transmitting mechanism 91 includes the drive-side timing pulley 92 attached to the output shaft 50a, the driven-side timing pulley 93 attached to the pulley attachment portion 12a of the rotary shaft 12, and the timing belt 94 wound on both timing pulleys 92 and 93. The timing belt 94 is passed through an opening 10b formed in the proximal end member 10.

This link operating device actuates the parallel link mechanism 1 by rotationally driving each position-controlling actuator 50. Specifically, when the position-controlling actuator 50 is rotationally driven, the power of the rotation thereof is lessened so as to reduce the speed of the rotation by the speed reduction mechanism 51, and the power of the rotation with a reduced speed is transmitted to the rotary shaft 12 via the power-transmitting mechanism 91. Accordingly, the angle of the proximal-side end link member 5 is changed so that the position of the distal-end-side link hub 3 is changed relative to the proximal-end-side link hub 2. Since the parallel link mechanism 1 is configured such that the distal-end-side link hub 3 is connected to the proximal-end-side link hub 2 so as to be changeable in position relative thereto via the three quadric chain link mechanisms 4, the link operating device becomes compact but can be operated over a wide operating range with high accuracy at high speed.

Since the end link members 5 and 6 are bent at the bent portions 30, the entire link operating device can have a reduced dimension in the radial direction, whereby a compact configuration can be obtained. Each of the rotational connection portions 31A and 31B of the end link members 5 and 6 includes the pair of rotational connection bodies 31a and 31b. Since each of the rotational connection bodies 31a and 31b is made of a metal sheet detachably attached to the bent portion 30, the rotational connection bodies 31a and 31b can be produced through sheet metal working at low cost with excellent mass productivity. Just by changing the size of the metal sheet used as the material, the rotational connection bodies 31a and 31b can be adapted to change in the size of the link operating device. Therefore, the size of the link operating device can be easily changed.

In addition, when each end link member 5, 6 is divided into two types of portions, i.e., the bent portion 30 and the rotational connection portions 31A, 31B, the shape of each portion can be simplified, whereby the working cost can be reduced and the mass productivity is improved. By forming the rotational connection bodies 31a and 31b of the rotational connection portions 31A and 31B in shapes that are identical with each other, the components can be shared, whereby the cost is low and the mass productivity is excellent. However, the thicknesses or the shapes of the rotational connection bodies 31a and 31b may be made different from each other in accordance with the locations at which the rotational connection bodies 31a and 31b are used and the strengths required for the rotational connection bodies 31a and 31b.

In this link operating device, the center axis O1 of the revolute pair portion between the proximal-end-side link hub 2 and the proximal-side end link member 5, and the output shaft 50a of the position-controlling actuator 50, are disposed on opposite sides with respect to the proximal end member 10. Accordingly, a configuration can be obtained in which the position-controlling actuator 50 or a part provided along with the position-controlling actuator 50 is not disposed near the revolute pair portion between the proximal-end-side link hub 2 and the proximal-side end link member 5. Thus, the position-controlling actuator 50 and the parallel link mechanism 1 are less likely to interfere with each other, whereby the parallel link mechanism 1 can have a reduced dimension in the radial direction but can have a wide motion range. In addition, since the position-controlling actuator 50 is located as described above, no component of the parallel link mechanism 1 is present on a surface, of the proximal end member 10, on a side opposite to the side where each link mechanism 4 is present, whereby the degree of freedom in designing regarding the disposition of the position-controlling actuator 50 is high.

Since the proximal end member 10 is flat-plate-shaped, the plurality of rotational support members 11 can be disposed on the proximal end member 10 without increasing the dimension, of the proximal end member 10, in a direction along the center axis QA of the proximal-end-side link hub 2. In addition, since the output shaft 50a of the position-controlling actuator 50 is parallel to the proximal end member 10, the output shaft 50a of the position-controlling actuator 50 can be disposed close to the proximal end member 10 as a whole. Furthermore, since the center axis O1 of the revolute pair portion between the proximal-end-side link hub 2 and the proximal-side end link member 5 is parallel to the proximal end member 10, the center axis O1 can be located close to the proximal end member 10 as a whole. With these features, it is possible to reduce the dimension, of the entire link operating device, in a direction along the center axis QA of the proximal-end-side link hub 2.

Since the through hole 10a is formed at the center portion, of the proximal end member 10, around which the plurality of rotational support members 11 are arranged, a wire or the like can be passed in the through hole 10a, whereby the wire or the like can be easily routed.

Second Application Embodiment

Figure 32:
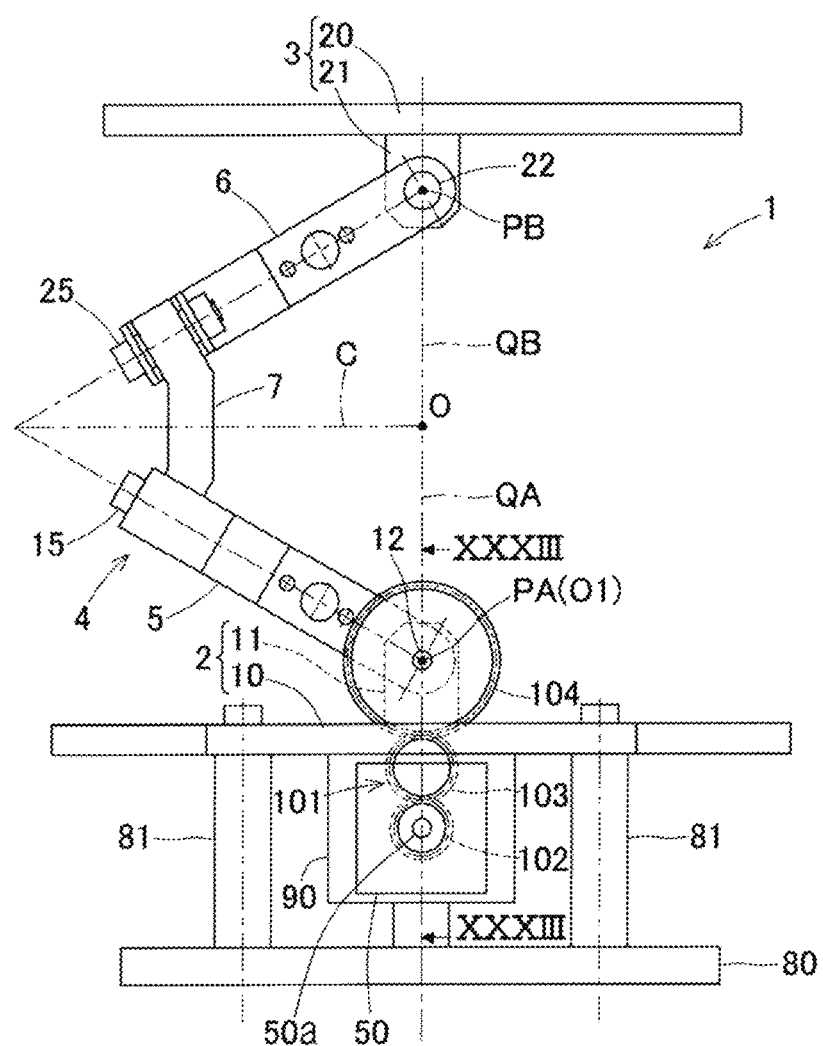
FIG. 32 is a front view of a link operating device according to a second application embodiment in the application mode of the present invention, with a portion thereof being omitted.
Figure 33:
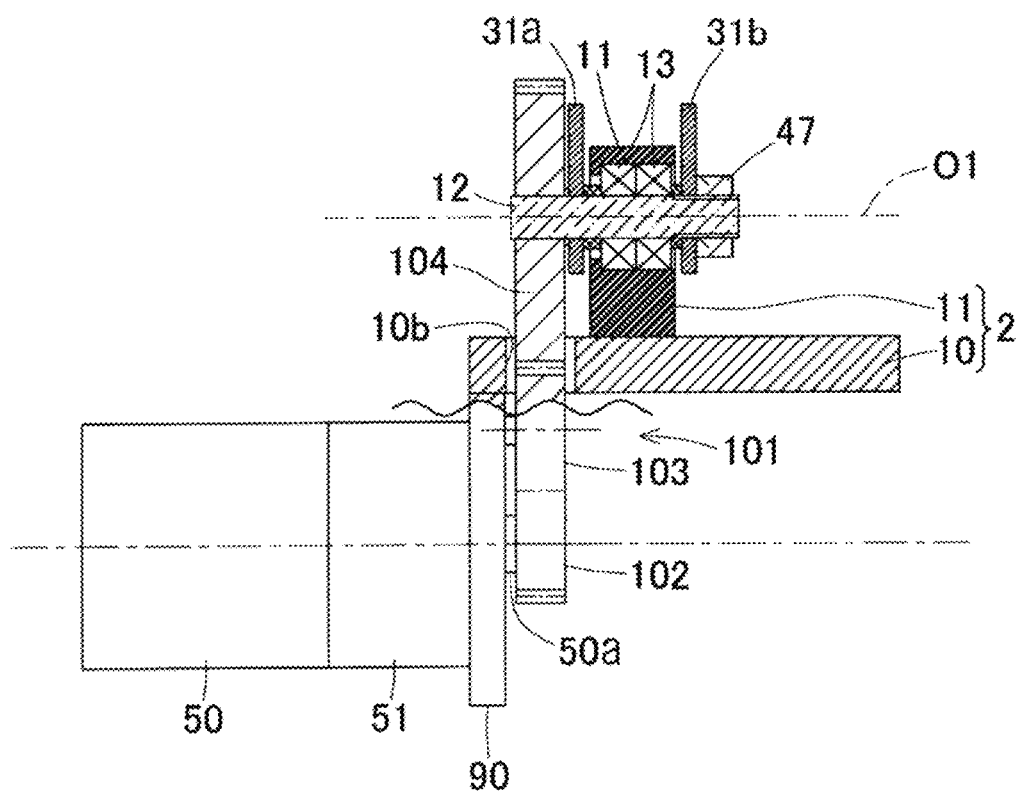
FIG. 33 is a cross-sectional view taken along a line XXXIII-XXXIII in FIG. 32.
Figure 34:
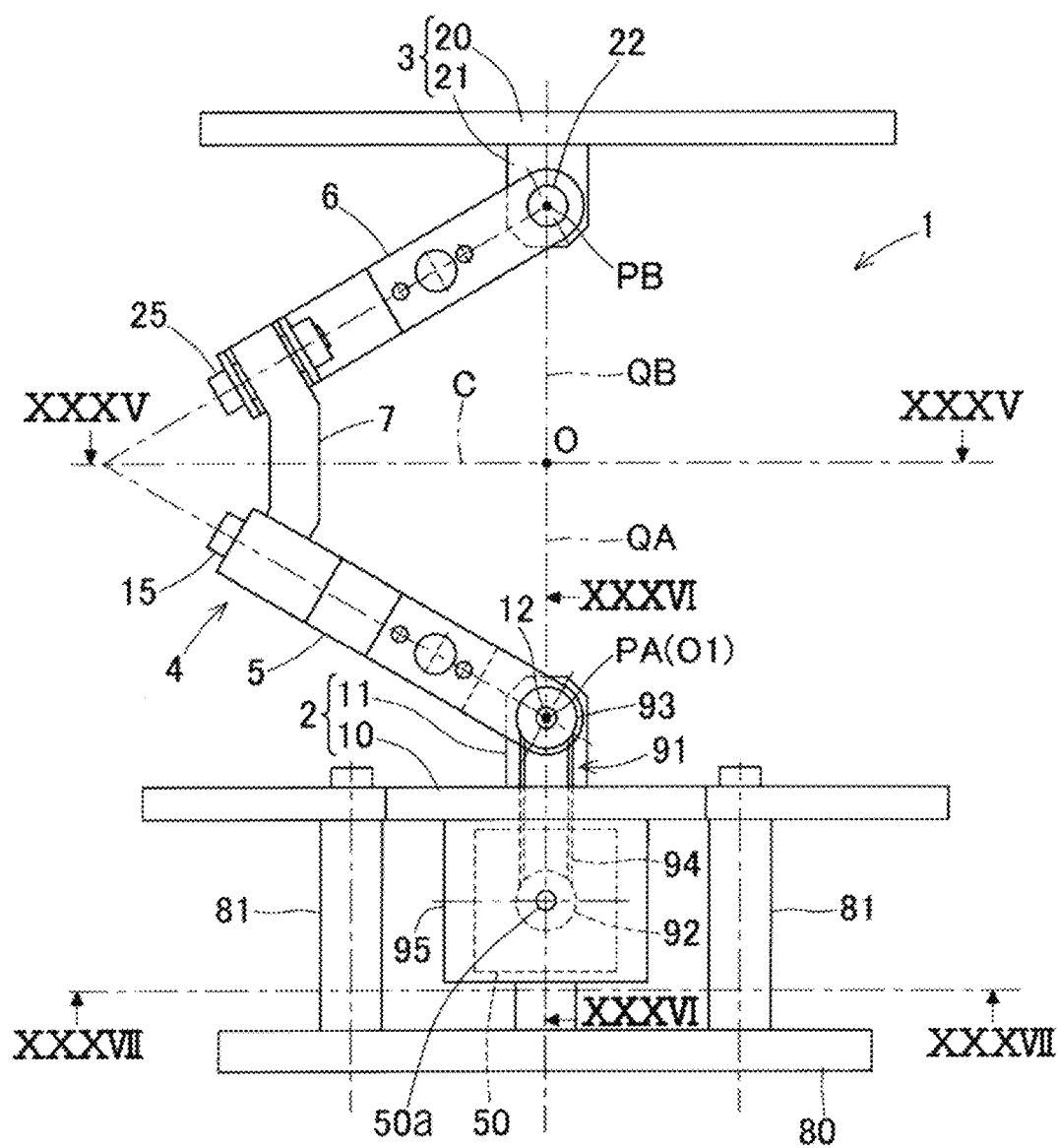
FIG. 34 is a front view of a link operating device according to a third application embodiment in the application mode of the present invention, with a portion thereof being omitted.
Figure 35:
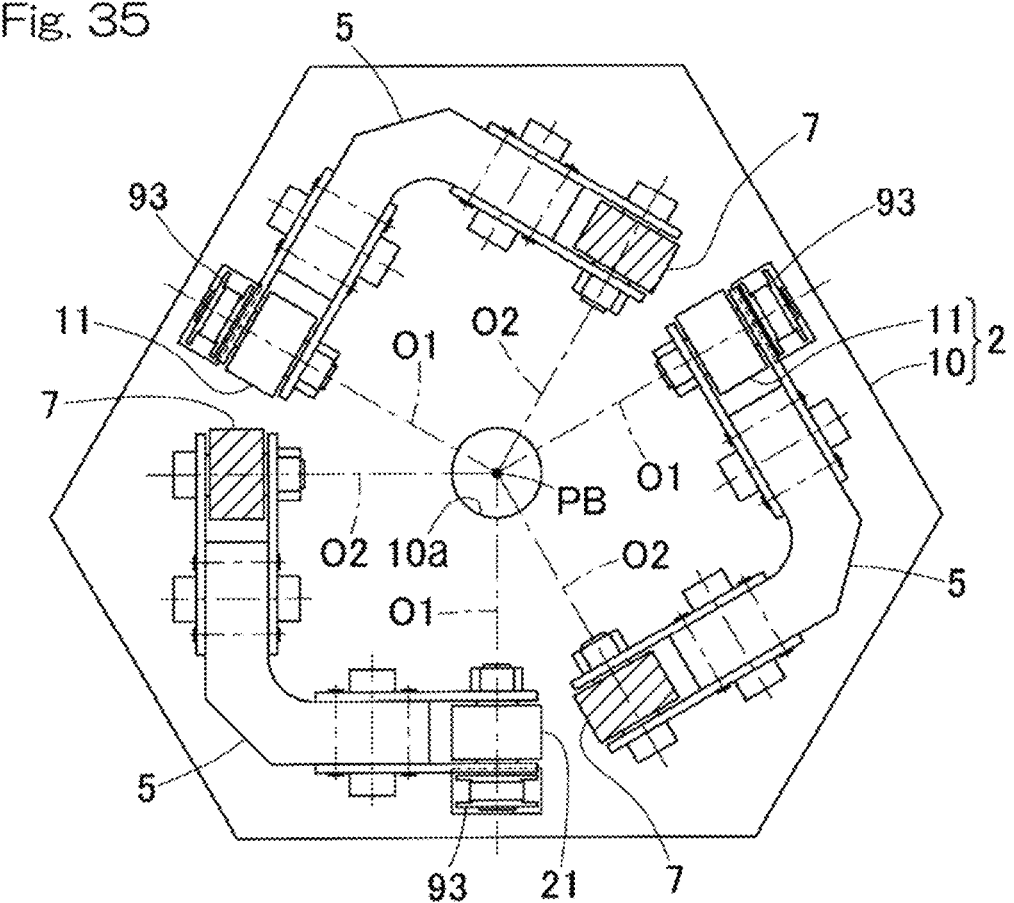
FIG. 35 is a cross-sectional view taken along a line XXXV-XXXV in FIG. 34.
Figure 36:
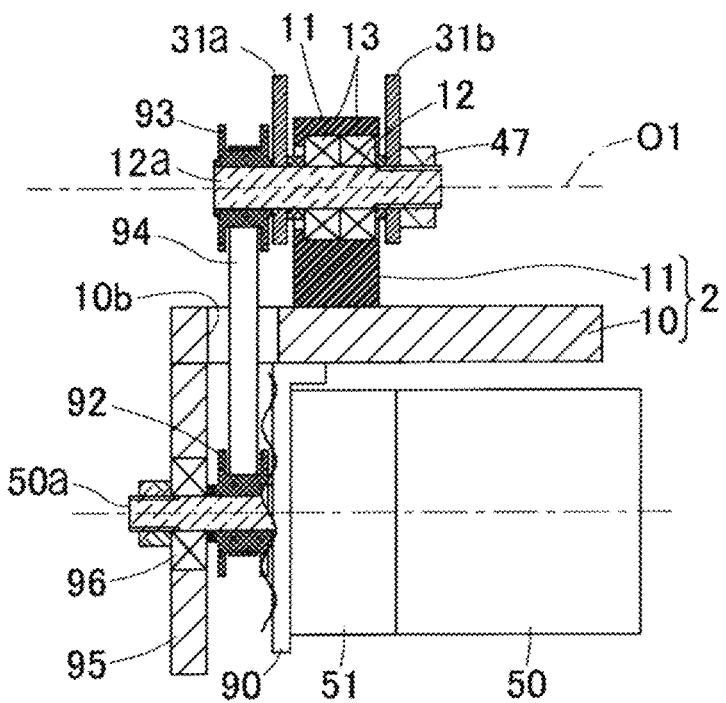
FIG. 36 is a cross-sectional view taken along a line XXXVI-XXXVI in FIG. 34.
Figure 37:
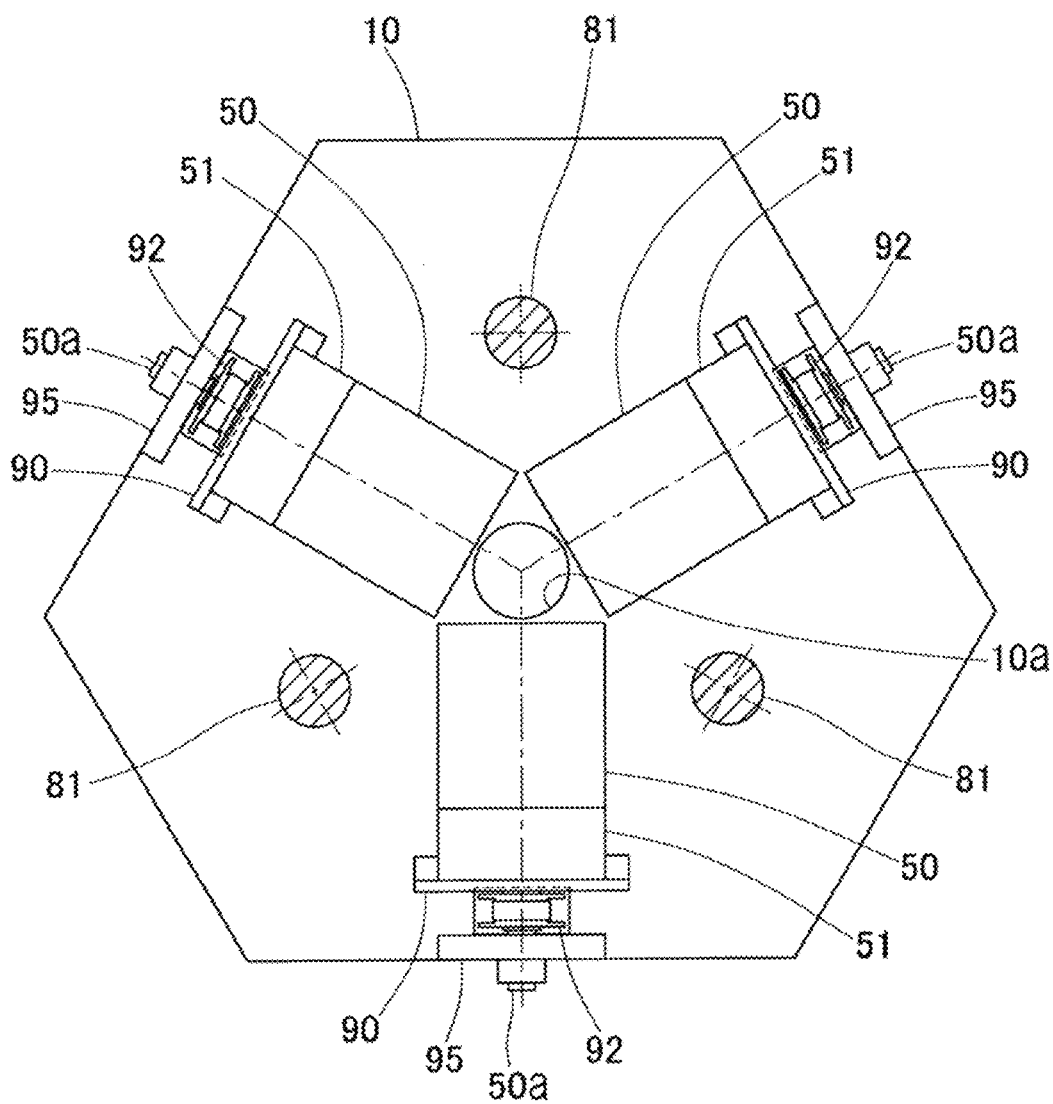
FIG. 37 is a cross-sectional view taken along a line XXXVII-XXXVII in FIG. 34.

FIGS. 32 and 33 show a second application embodiment of the present invention. In this link operating device, the power-transmitting mechanism 101 for transmitting rotation from the output shaft 50a of the position-controlling actuator 50 to the rotary shaft 12, is implemented by a train of gears. That is, the power-transmitting mechanism 101 includes the drive gear 102 attached to the output shaft 50a, the counter gear 103 rotatably supported by the actuator support member 90, and the driven gear 104 attached to the rotary shaft 12. Portions of the counter gear 103 and the driven gear 104 are disposed in the opening 10b formed in the proximal end member 10. In the shown example, each of the gears 102, 103, and 104 is a spur gear, but gears other than the spur gears may be used to compose the train of gears. The other components are the same as those in the first application embodiment.

Also in the case where a geared mechanism is used as the power-transmitting mechanism 101 as described above, the same operations and effects as those in the case where a belt-type mechanism is used, are obtained. Although the number of gears in the shown power-transmitting mechanism 101 is three, the number may be other than three. In addition, although rotation is transmitted from the output shaft 50a of the position-controlling actuator 50 to the rotary shaft 12 with the same direction in the shown power-transmitting mechanism 101, the rotation may be transmitted with opposite directions.

Third Application Embodiment

FIGS. 34 to 37 show a third application embodiment of the present invention. In this link operating device, the disposition of each position-controlling actuator 50 is different from that in the first application embodiment. That is, in the first application embodiment, each position-controlling actuator 50 is disposed outward relative to the output shaft 50a thereof, whereas, in the third application embodiment, each position-controlling actuator 50 is disposed inward relative to the output shaft 50a thereof.

Specifically, the actuator support member 90 is positioned so as to be slightly shifted to the inner diameter side from the outer circumferential edge of the bottom surface of the proximal end member 10, and the position-controlling actuator 90 and the speed reduction mechanism 51 are attached to the inner surface of the actuator support member 90. The output shaft 50a of the position-controlling actuator 50 extends to the outer diameter side. The actuator rotational support member 95 is disposed on the outer circumferential edge of the bottom surface of the proximal end member 10, and the output shaft 50a is rotatably supported by the actuator rotational support member 95 via the bearing 96. The other components are the same as those in the first application embodiment.

By disposing each position-controlling actuator 50 inward as described above, the dimension in the radial direction of an area in which the position-controlling actuators 50 are disposed is reduced, whereby a compact configuration can be obtained. Specifically, each position-controlling actuator 50 can be prevented from projecting to the outer diameter side relative to the proximal end member 10 by being disposed within a range below the proximal end member 10.

Although the dimension in the radial direction can be reduced also by vertically disposing the position-controlling actuator 50 along the center axis QA of the proximal-end-side link hub 2, this disposition results in increase in the dimension in the vertical direction along the center axis QA of the proximal-end-side link hub 2. On the other hand, the disposition in the third application embodiment allows dimensions in both the radial direction and the vertical direction to be reduced.

Fourth Application Embodiment

Figure 38:
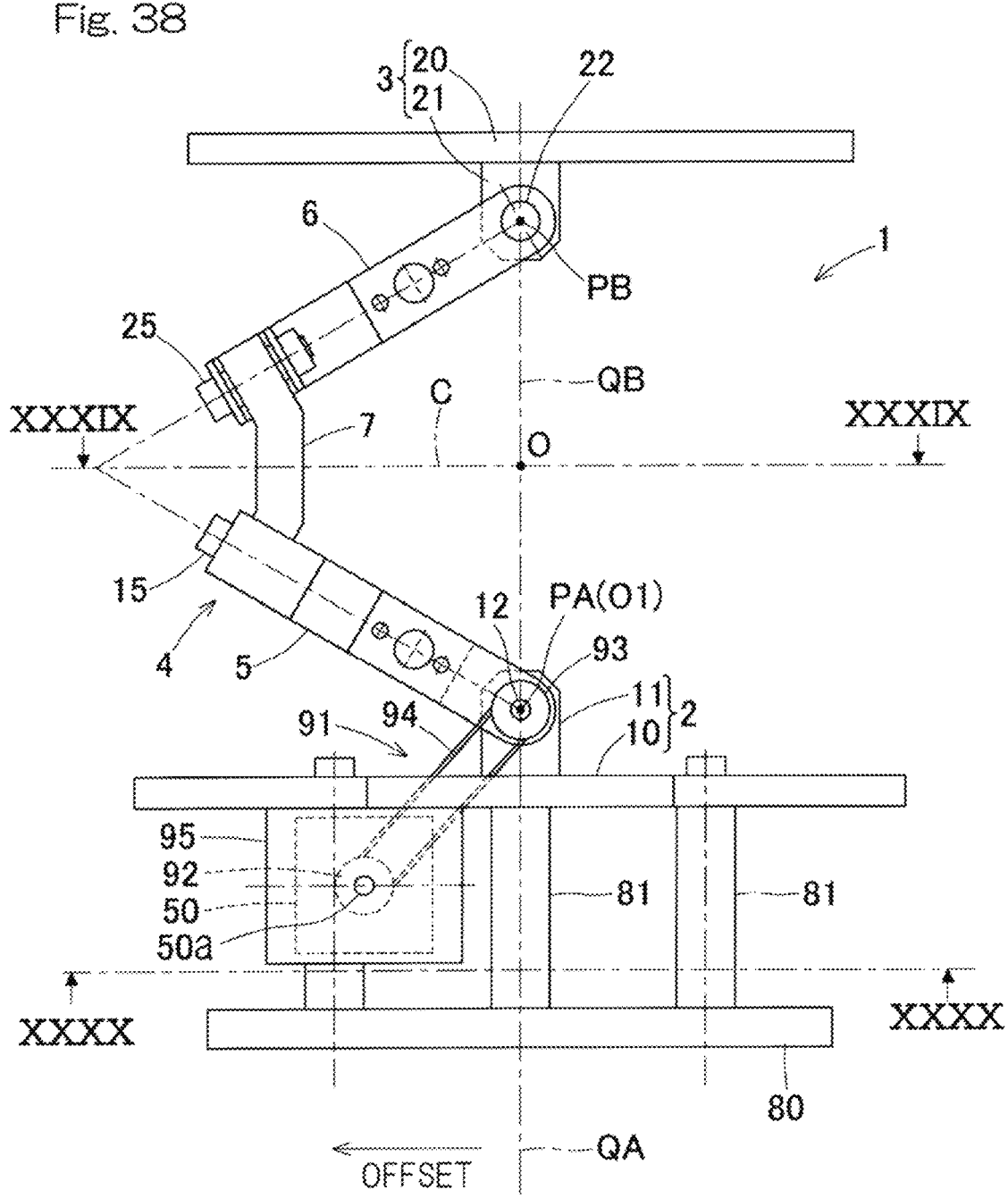
FIG. 38 is a front view of a link operating device according to a fourth application embodiment in the application mode of the present invention, with a portion thereof being omitted.
Figure 39:
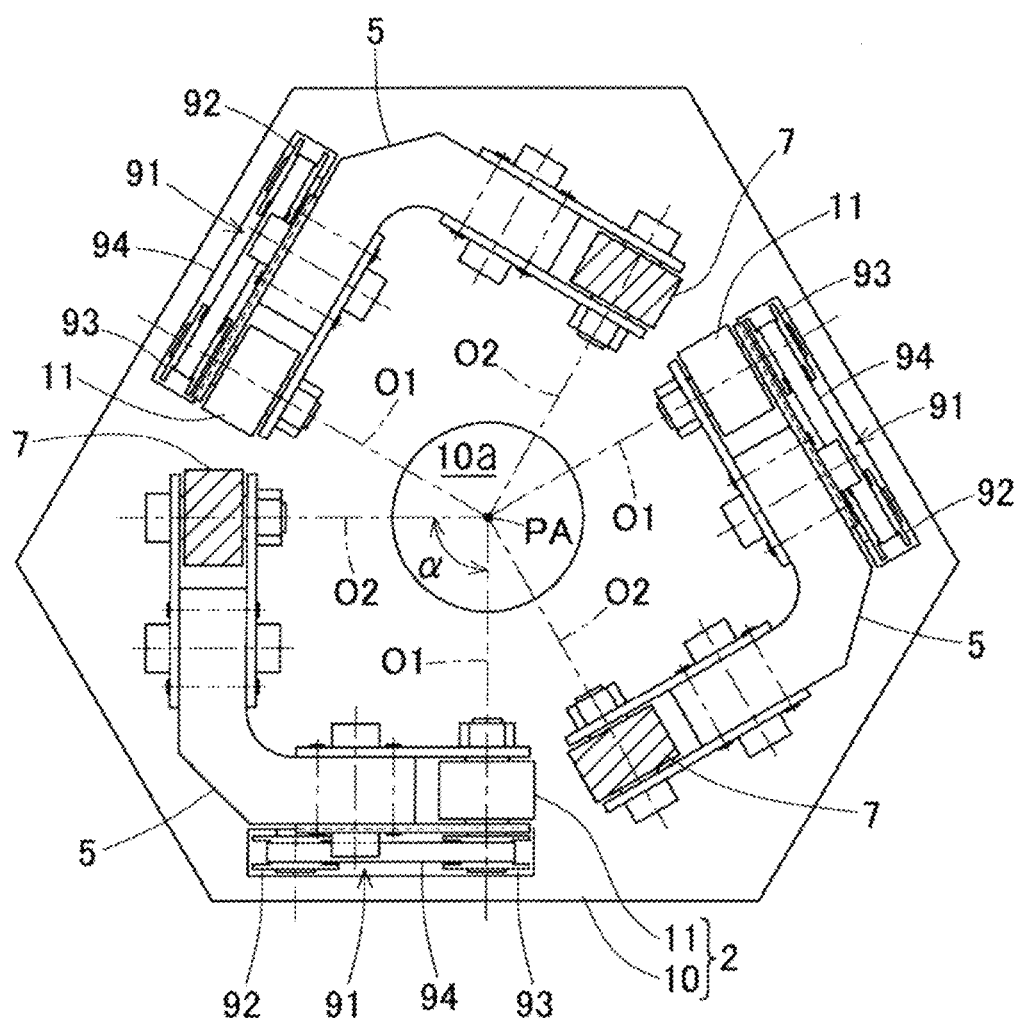
FIG. 39 is a cross-sectional view taken along a line XXXIX-XXXIX in FIG. 38.
Figure 40:
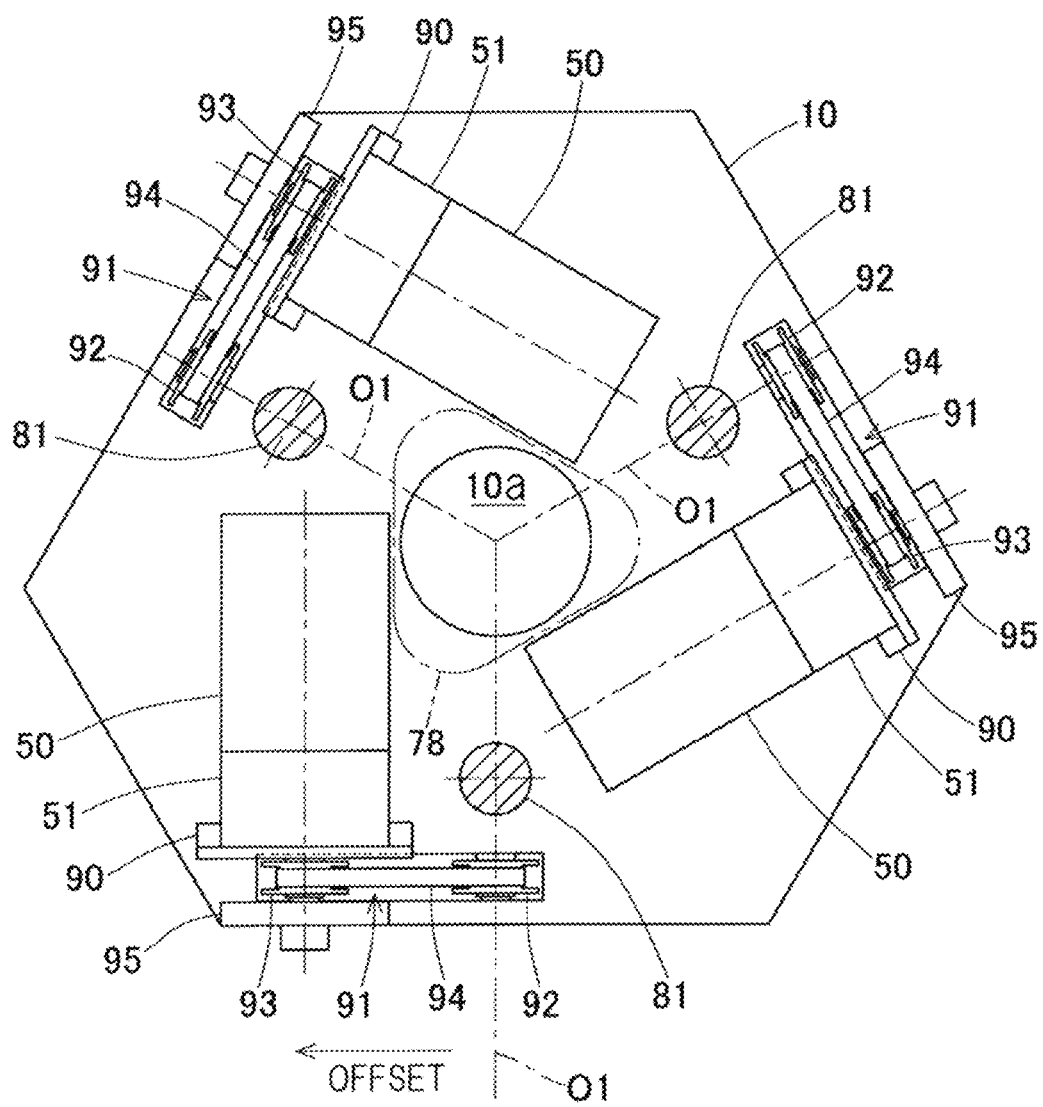
FIG. 40 is a cross-sectional view taken along a line XXXX-XXXX in FIG. 38.

FIGS. 38 to 40 show a fourth application embodiment of the present invention. In this link operating device, unlike the third application embodiment, the position-controlling actuator 50 is arranged such that the output shaft 50a thereof is parallelly offset from a plane formed by the center axis QA of the proximal-end-side link hub 2 and the center axis O1 of the revolute pair formed between the proximal-end-side link hub 2 and the proximal-side end link member 5. The other components are the same as those in the third application embodiment.

By disposing the position-controlling actuator 50 in an offset manner as described above, the position-controlling actuators 50 can be prevented from interfering with each other even if the position-controlling actuators 50 are long in the axial directions of the output shafts 50a. In addition, a wide space 78 for allowing a wire or the like to pass therethrough can be secured at a center portion in the radial direction of the area in which the position-controlling actuators 50 are disposed. Also the through hole 10a of the proximal end member 10 is accordingly increased.

REFERENCE NUMERALS

1 . . . Parallel link mechanism
2 . . . Proximal-end-side link hub
3 . . . Distal-end-side link hub
4 . . . Link mechanism
5 . . . Proximal-side end link member
6 . . . Distal-side end link member
7 . . . Center link member
10 . . . Proximal end member
10a . . . Through hole
11 . . . Rotational support member
30 . . . Bent portion
31A, 31B . . . Rotational connection portion
31a, 31b . . . Rotational connection body
50 . . . Position-controlling actuator
50a . . . Rotational output shaft
51 . . . Speed reduction mechanism
51a . . . Input shaft of speed reduction mechanism
51b . . . Output shaft of speed reduction mechanism
92, 93 . . . Timing pulley
94 . . . Timing belt
O1 . . . Center axis of revolute pair formed between proximal-end-side link hub and proximal-side end link member
PA . . . Proximal-end-side spherical link center
QA . . . Center axis of proximal-end-side link hub

What is claimed is:

1. A link operating device comprising:
a proximal-end-side link hub;
a distal-end-side link hub;
at least three link mechanisms via which the distal-end-side link hub is connected to the proximal-end-side link hub so as to be changeable in position relative thereto, each link mechanism including
a proximal-side end link member having one end pivotably coupled to the proximal-end-side link hub,
a distal-side end link member having one end pivotably coupled to the distal-end-side link hub, and
a center link member having opposite ends pivotably coupled to another end of the proximal-side end link member and another end of the distal-side end link member, respectively;
position-controlling actuators provided to two or more link mechanisms among the at least three link mechanisms, and each configured to change the position of the distal-end-side link hub relative to the proximal-end-side link hub; and
speed reduction mechanisms each including an input shaft and an output shaft coaxial with each other and configured to reduce a speed of rotation of a respective position-controlling actuator and transmit a power of the rotation of the respective position-controlling actuator to the corresponding proximal-side end link member,
wherein the proximal-side end link member includes a bent portion bent at an angle, and a rotational connection portion disposed at one end of the bent portion and including a pair of rotational connection bodies arranged so as to be spaced from each other,
each speed reduction mechanism is disposed between the corresponding pair of rotational connection bodies such that axes of the input shaft and the output shaft coincide with a center axis of a revolute pair formed between the proximal-end-side link hub and the proximal-side end link member, and
the output shaft of the speed reduction mechanism is fixed to one rotational connection body of the pair of rotational connection bodies, and the input shaft of the speed reduction mechanism is rotatably supported by another rotational connection body of the pair of rotational connection bodies.

2. The link operating device as claimed in claim 1, wherein each position-controlling actuator is disposed such that axes of a rotational output shaft of the position-controlling actuator and the input shaft of the corresponding speed reduction mechanism are orthogonal to each other.

3. The link operating device as claimed in claim 2, wherein the center axis of the revolute pair formed between the proximal-end-side link hub and each proximal-side end link member intersects, at a proximal-end-side spherical link center, with a center axis of a revolute pair formed between the proximal-side end link member and the corresponding center link member, and the rotational output shaft of each position-controlling actuator is parallel to a center axis of the proximal-end-side link hub, which is defined as a straight line passing the proximal-end-side spherical link center and intersecting, at a right angle, with the center axis of the revolute pair formed between the proximal-end-side link hub and the proximal-side end link member.

4. The link operating device as claimed in claim 1, wherein each position-controlling actuator is disposed such that a rotational output shaft of the position-controlling actuator and the input shaft of the corresponding speed reduction mechanism are parallel to each other.

5. The link operating device as claimed in claim 4, wherein a power-transmitting belt is wound on a pulley attached to the rotational output shaft of each position-controlling actuator and a pulley attached to the input shaft of the corresponding speed reduction mechanism.

6. The link operating device as claimed in claim 1,
wherein the proximal-end-side link hub includes a proximal end member that supports each link mechanism, and
the center axis of the revolute pair formed between the proximal-end-side link hub and each proximal-side end link member, and an output shaft of the corresponding position-controlling actuator, are disposed on opposite sides with respect to the proximal end member.

7. The link operating device as claimed in claim 6, wherein the proximal-end-side link hub includes a plurality of rotational support members disposed so as to project from the proximal end member toward a distal end side of the link operating device and configured to rotatably support the respective proximal-side end link members, and
the output shaft of each position-controlling actuator is parallel to a mounting surface of the proximal end member, on which the plurality of rotational support members are arranged.

8. The link operating device as claimed in claim 6, wherein the proximal-end-side link hub includes a plurality of rotational support members disposed so as to project from the proximal end member toward a distal end side of the link operating device and configured to rotatably support the respective proximal-side end link members, and the center axis of the revolute pair formed between the proximal-end-side link hub and each proximal-side end link member is parallel to a mounting surface of the proximal end member, on which the plurality of rotational support members are arranged.

9. The link operating device as claimed in claim 6, wherein the proximal end member has a through hole at a center portion thereof around which the plurality of rotational support members are arranged.

10. The link operating device as claimed in claim 6, wherein each position-controlling actuator is disposed inward relative to the output shaft thereof.

11. The link operating device as claimed in claim 10,
wherein the center axis of the revolute pair formed between the proximal-end-side link hub and each proximal-side end link member intersects, at the proximal-end-side spherical link center, with the center axis of the revolute pair formed between the proximal-side end link member and the corresponding center link member, and
the corresponding position-controlling actuator is disposed such that the output shaft thereof is parallelly offset from a plane formed by: the center axis of the revolute pair formed between the proximal-end-side link hub and the proximal-side end link member; and the center axis of the proximal-end-side link hub, which is defined as a straight line passing the proximal-end-side spherical link center and intersecting, at a right angle, with the center axis of the revolute pair formed between the proximal-end-side link hub and the proximal-side end link member.

\* \* \* \* \*